United States Patent [19]

Magara et al.

[11] Patent Number: 5,233,148
[45] Date of Patent: Aug. 3, 1993

[54] ELECTRICAL DISCHARGE MACHINE WITH MACHINING GAP VOLTAGE CONTROL

[75] Inventors: Takuji Magara; Hisashi Yamada; Yasushi Endou, all of Aichi, Japan

[73] Assignee: Mitsubishi Denki K.K., Tokyo, Japan

[21] Appl. No.: 801,962

[22] Filed: Nov. 27, 1991

[30] Foreign Application Priority Data

Nov. 29, 1990 [JP] Japan .................. 2-333282

[51] Int. Cl.⁵ .................................. B23H 1/02
[52] U.S. Cl. ...................... 219/69.13; 219/69.18
[58] Field of Search ............... 219/69.13, 69.18, 69.19

[56] References Cited

U.S. PATENT DOCUMENTS

| 3,655,936 | 4/1972 | Saito et al. | 219/69.13 |
| 3,755,645 | 8/1973 | Kauffman | 219/69.13 |
| 4,335,294 | 6/1982 | Inoue | 219/69.18 |
| 4,447,713 | 5/1984 | Tsurumoto et al. | 219/69.18 |
| 4,450,337 | 5/1984 | Inoue | 219/69.18 |

FOREIGN PATENT DOCUMENTS 59-232726 12/1984 Japan.
2-44648 10/1990 Japan.

Primary Examiner—Geoffrey S. Evans
Attorney, Agent, or Firm—Sughrue, Mion, Zinn, Macpeak & Seas

[57] ABSTRACT

In an electrical discharge machining apparatus, the average machining gap voltage is controlled to be a predetermined value even if a discharging operation is interrupted. This is accomplished by providing a bypass circuit or an inverse voltage providing circuit that responds to an interruption in the discharging operation. By controlling the average machining gap voltage, electrolytic corrosion and magnetization of the workpiece is minimized.

10 Claims, 33 Drawing Sheets

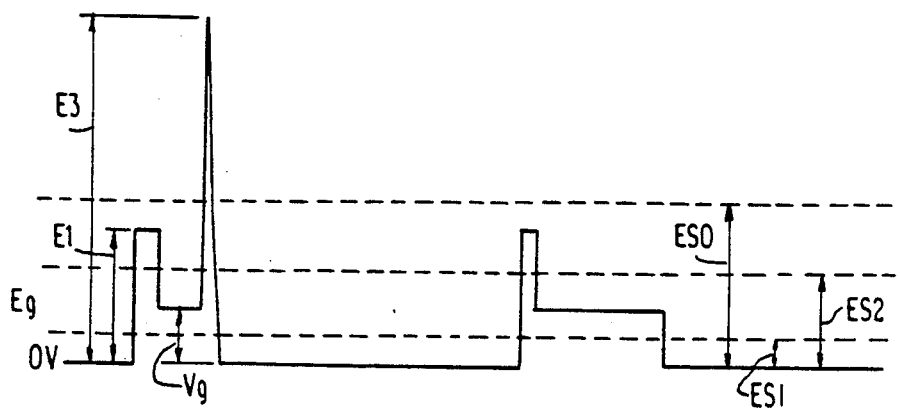
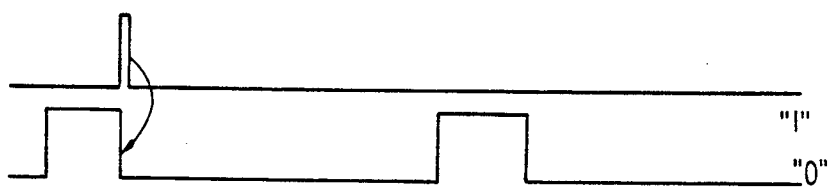
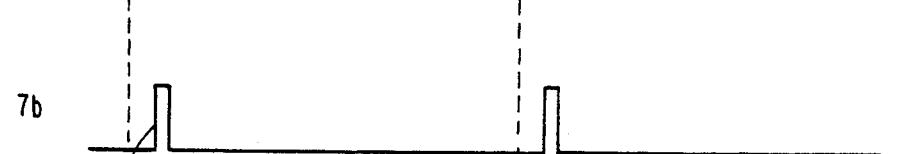
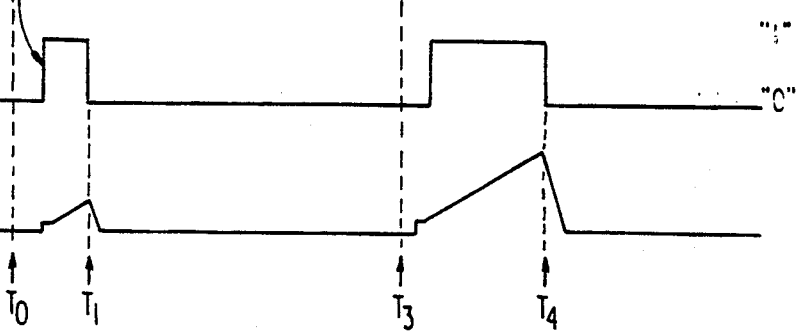

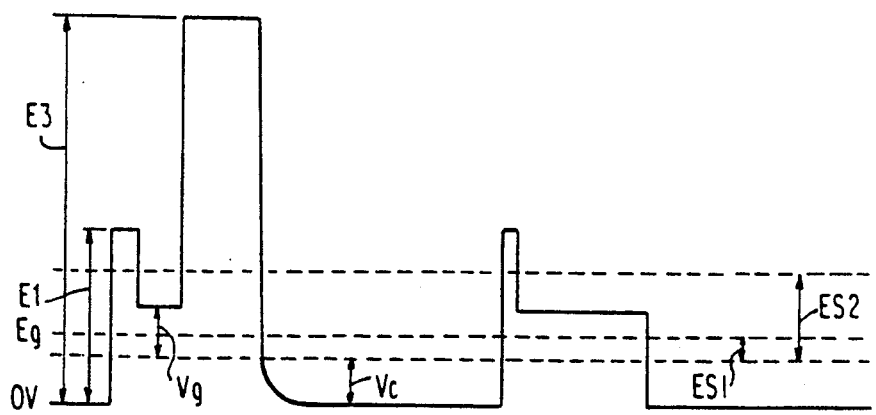
FIG.6a
FIG.6b 7a
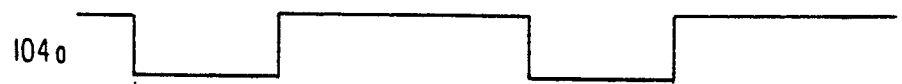
FIG.6c 104a
FIG.6d 7b
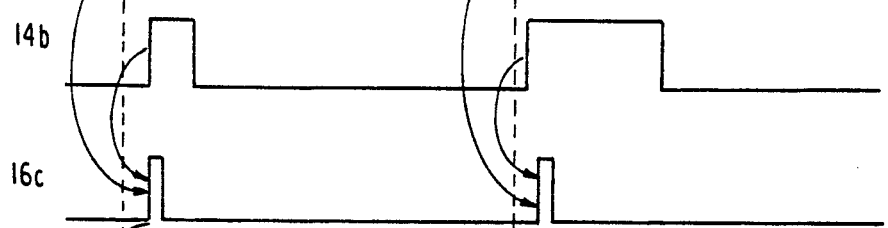
FIG.6e 14b
FIG.6f 16c
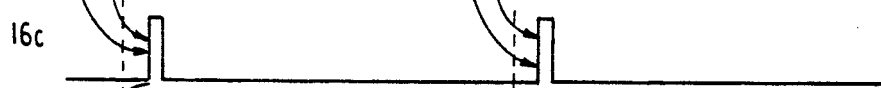
FIG.6g 15b
FIG.6h ig
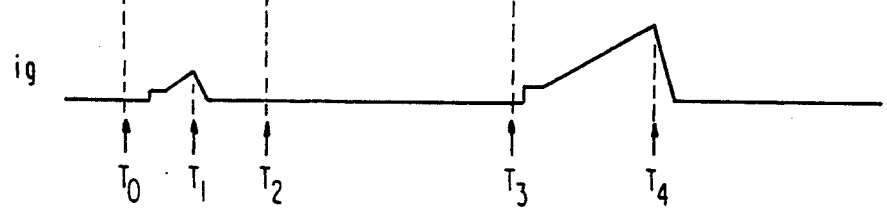

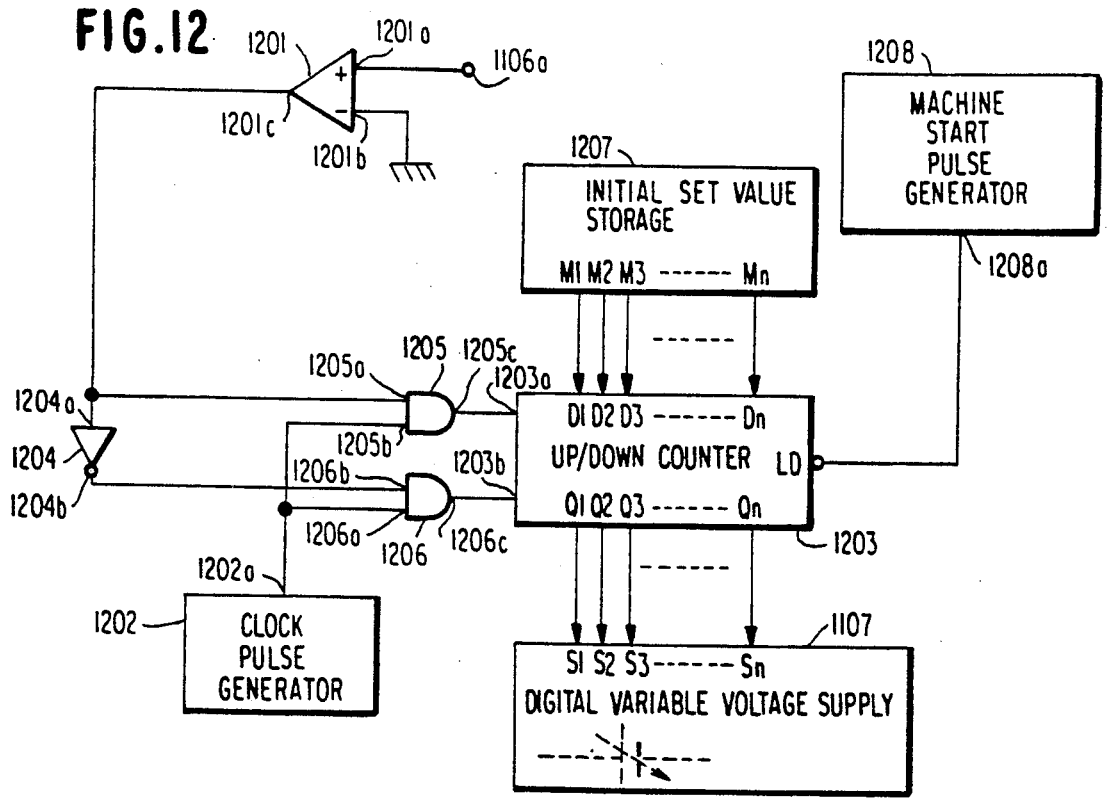
FIG.12
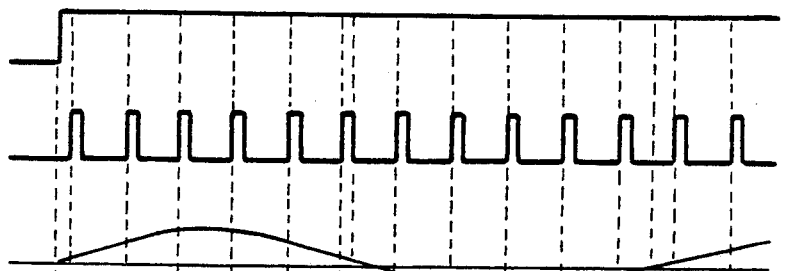
FIG.13a
FIG.13b
FIG.13c
FIG.13d
FIG.13e
FIG.13f
FIG.13g FIG.15a  Eg
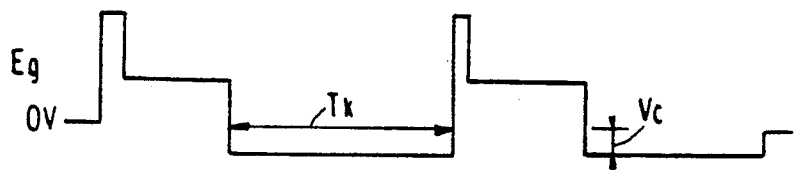
FIG.15b  7a
FIG.15c  104a
FIG.15d  7b
FIG.15e  14b
FIG.15f  16c
FIG.15g  15b
FIG.15h  ig

FIG.18a
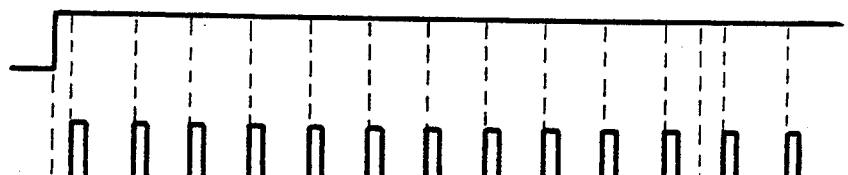
FIG.18b
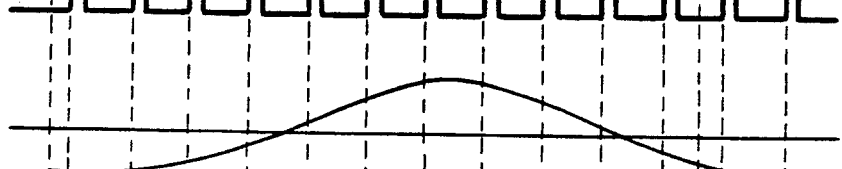
FIG.18c
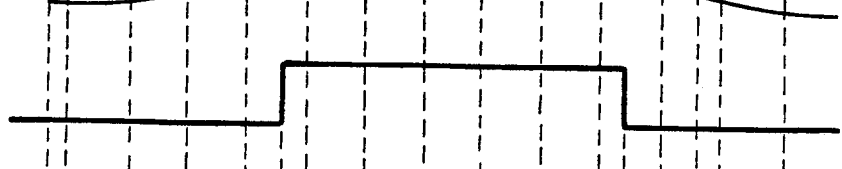
FIG.18d
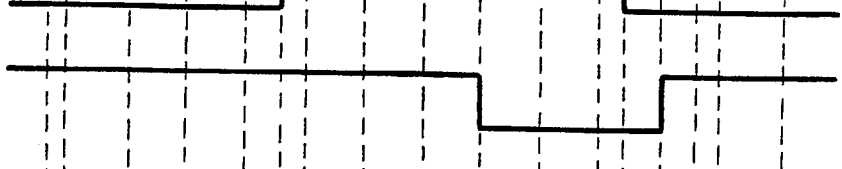
FIG.18dd
FIG.18e
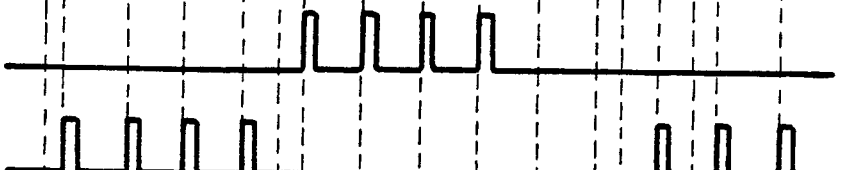
FIG.18f
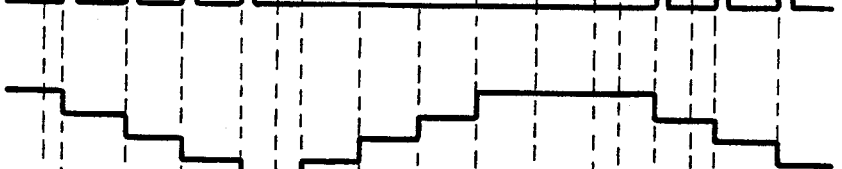
FIG.18g
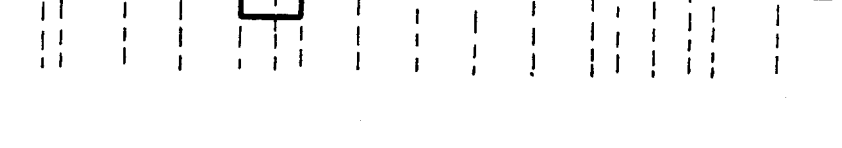

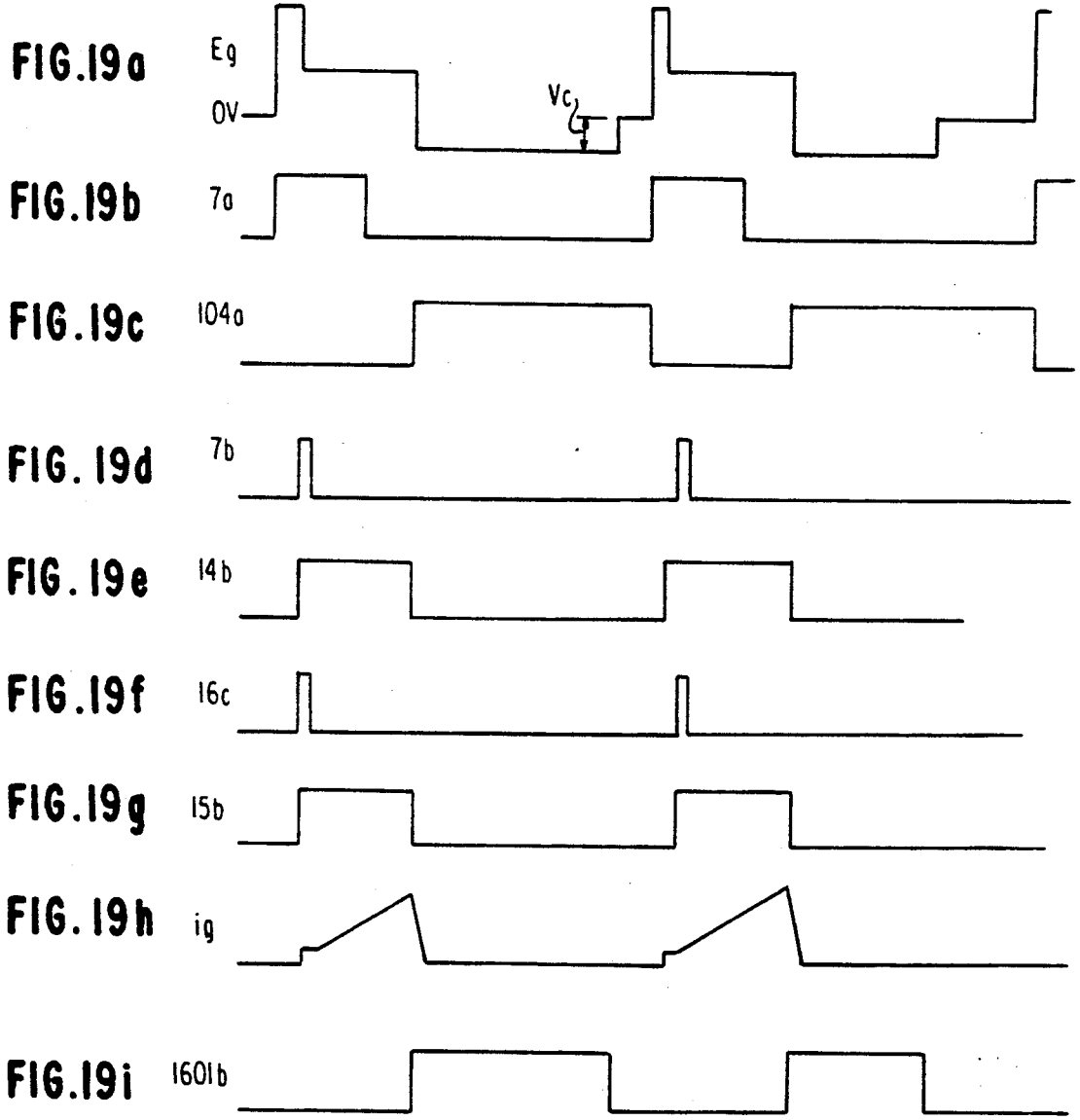

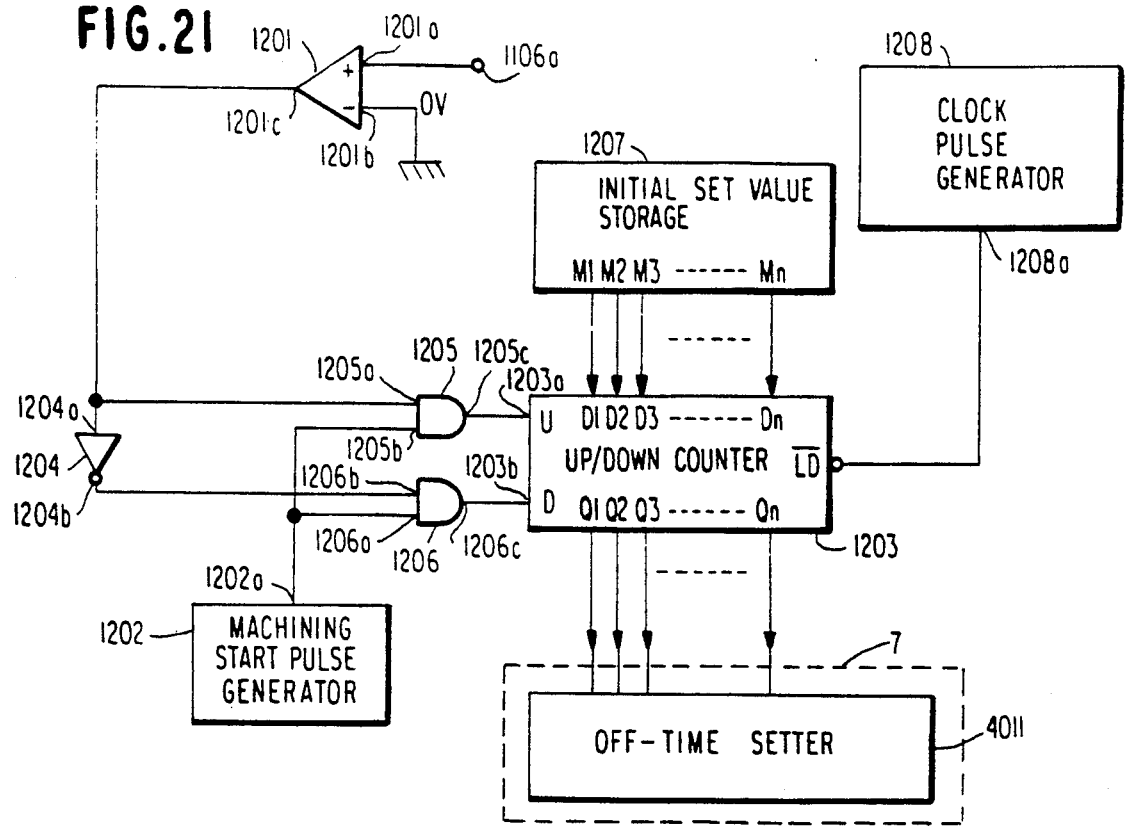
FIG.21
FIG.22a
FIG.22b
FIG.22c
FIG.22d
FIG.22e
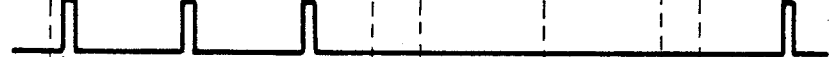
FIG.22f
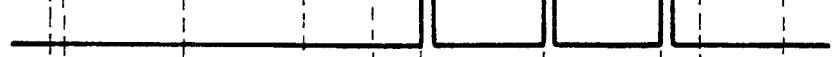
FIG.22g
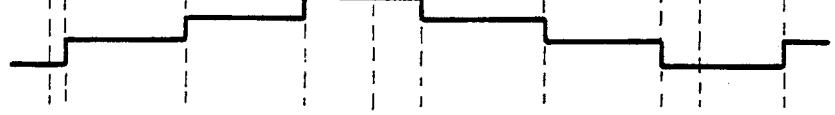

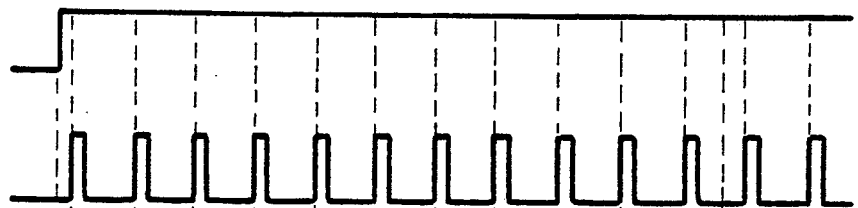
FIG. 26 a
FIG. 26 b
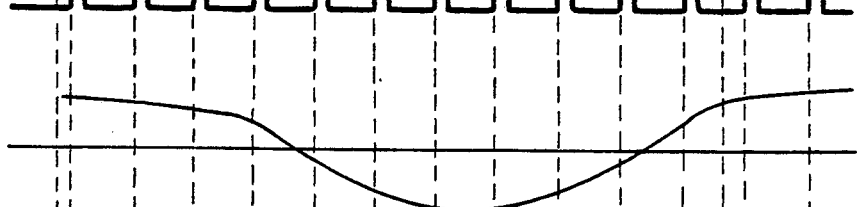
FIG. 26 c
FIG. 26 d
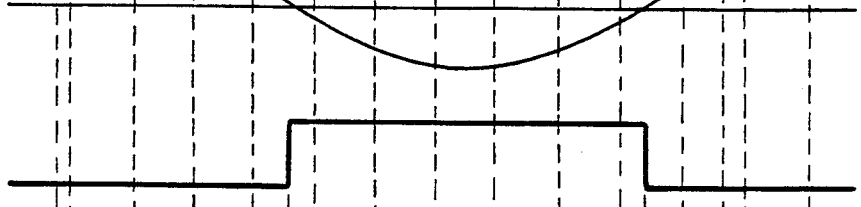
FIG. 26 e
FIG. 26 f
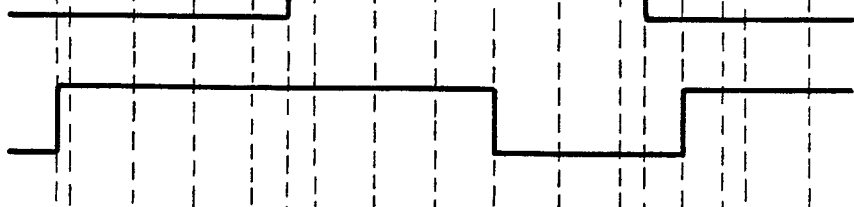
FIG. 26 g
FIG. 26 h FIG.27a
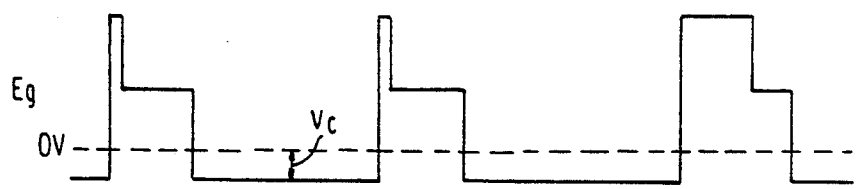
FIG.27b
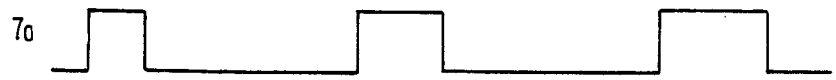
FIG.27c
FIG.27d
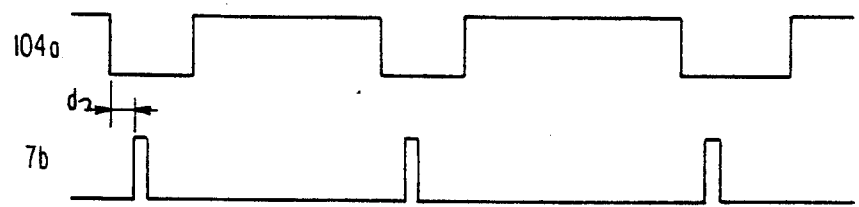
FIG.27e
FIG.27f
FIG.27g
FIG.27h
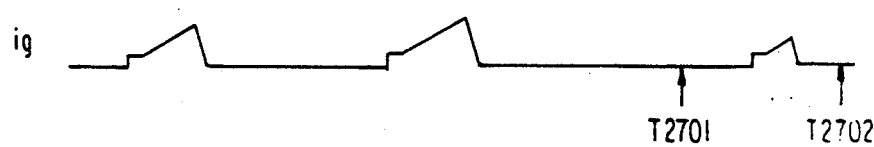

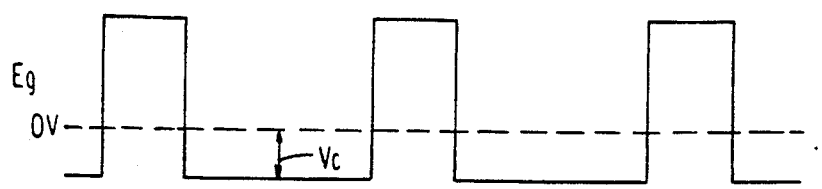
FIG.28a
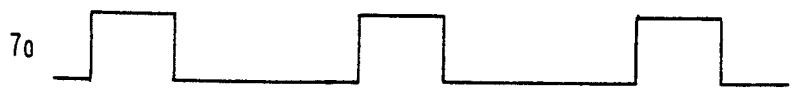
FIG.28b
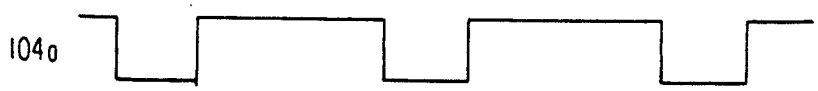
FIG.28c
FIG.28d
FIG.28e
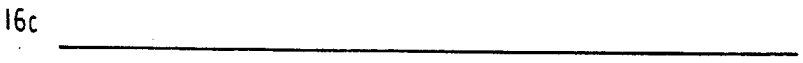
FIG.28f
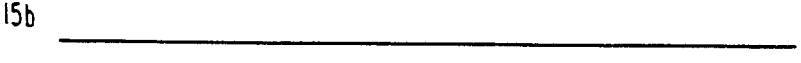
FIG.28g
FIG.28h
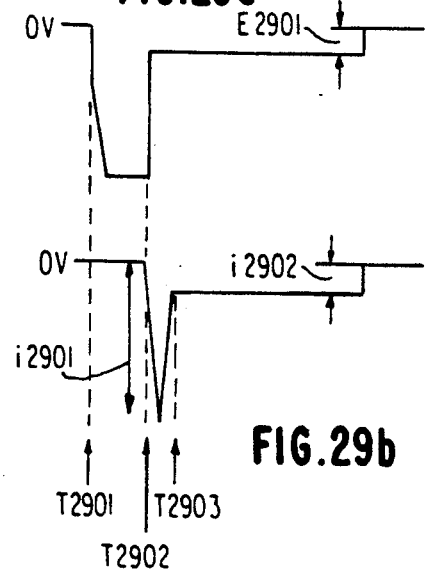
FIG.29a
FIG.29b
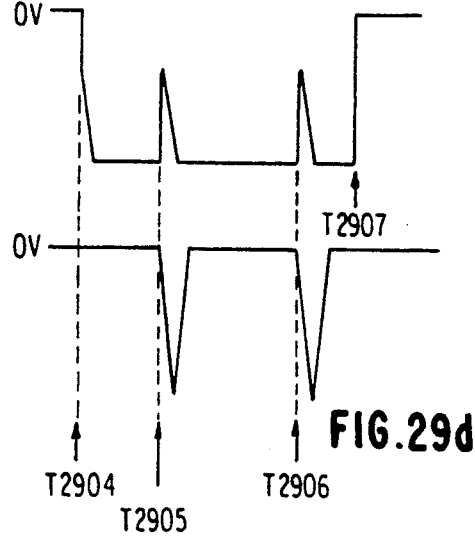
FIG.29c
FIG.29d

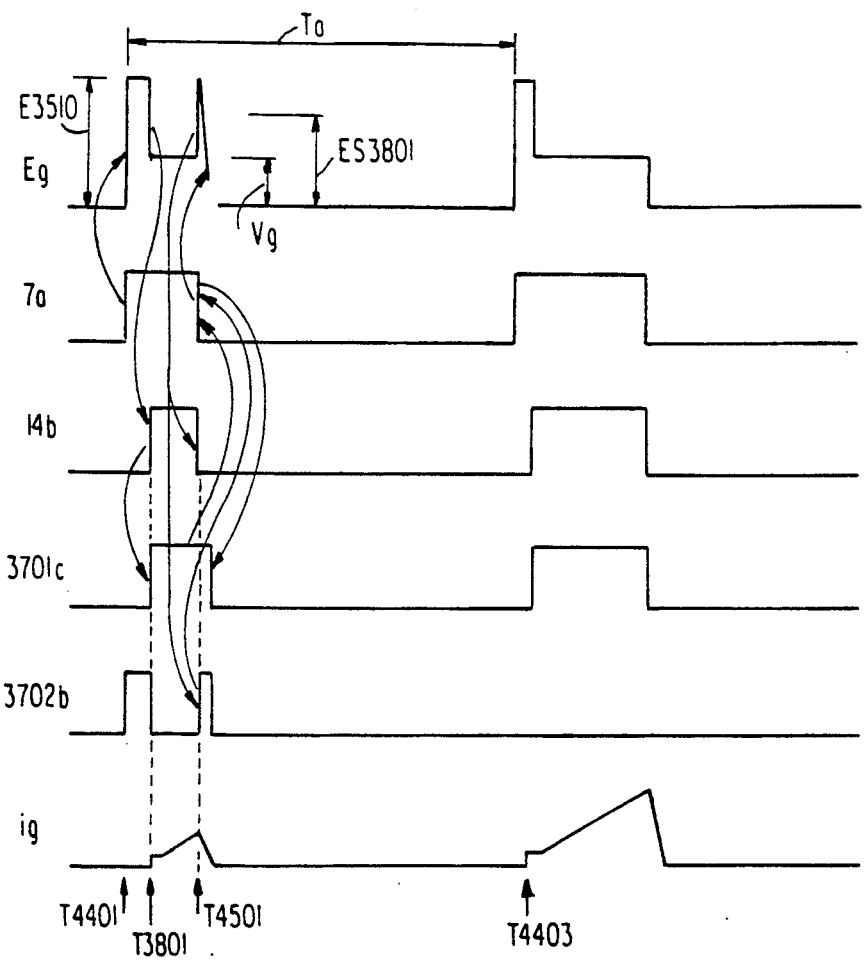
PRIOR ART FIG.38a
PRIOR ART FIG.38b
PRIOR ART FIG.38c
PRIOR ART FIG.38d
PRIOR ART FIG.38e
PRIOR ART FIG.38f
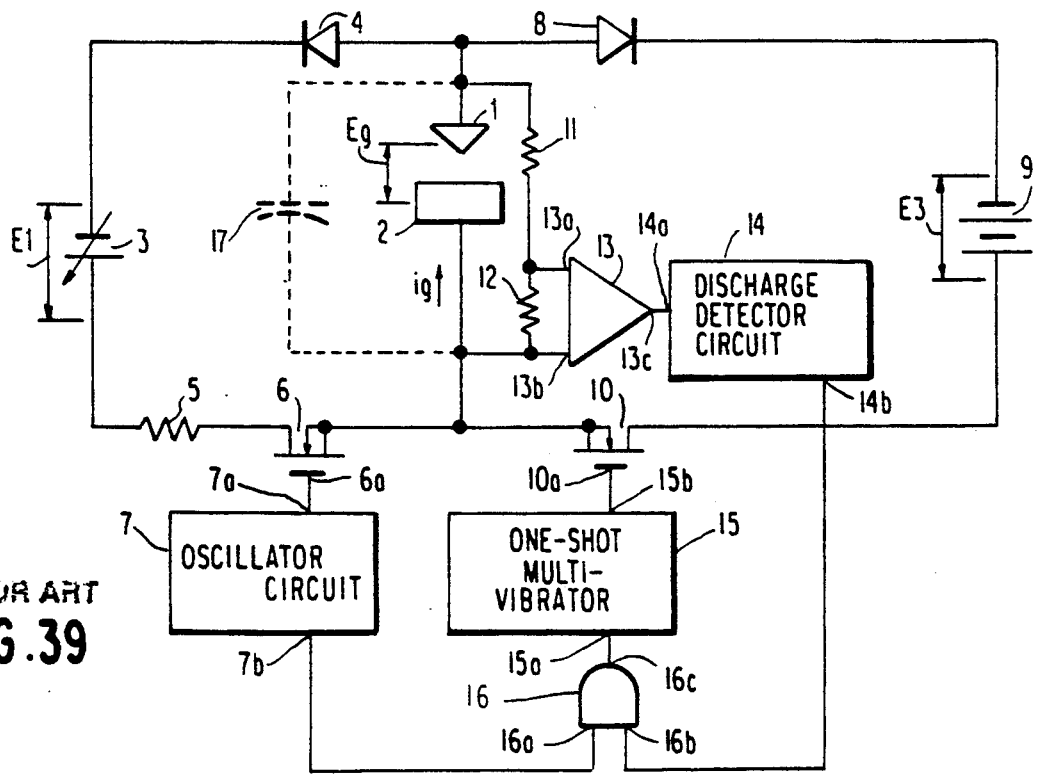
PRIOR ART FIG.39

PRIOR ART
FIG. 40
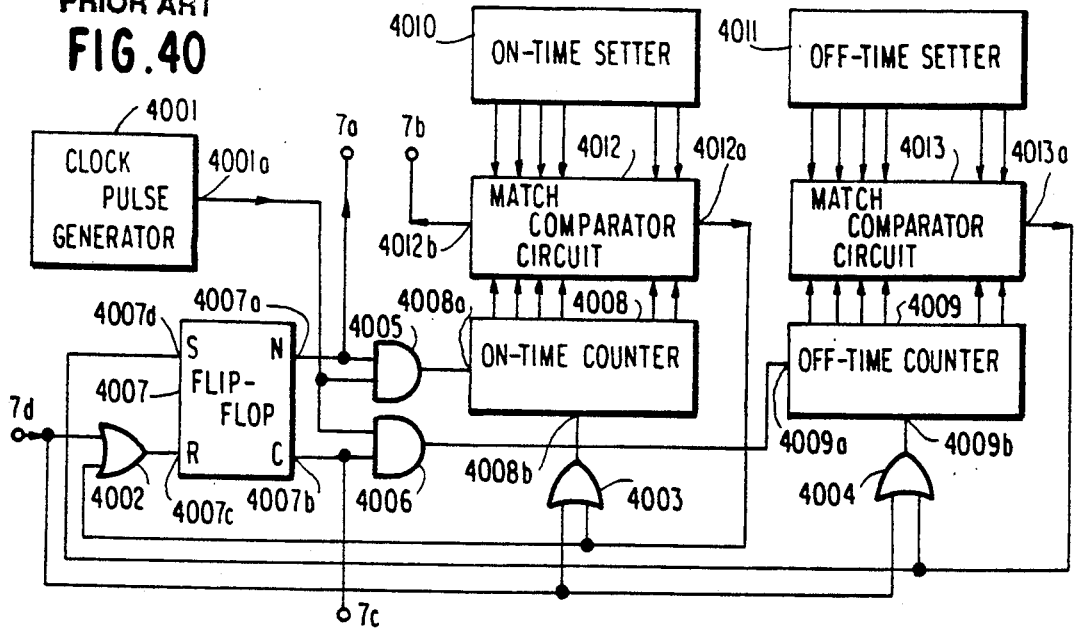
PRIOR ART
FIG. 41a
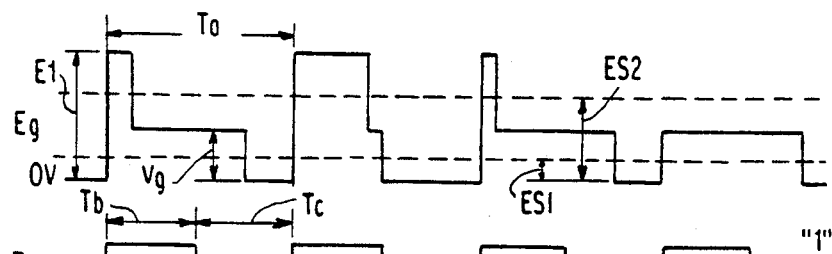
PRIOR ART
FIG. 41b    7a
PRIOR ART
FIG. 41c    7b
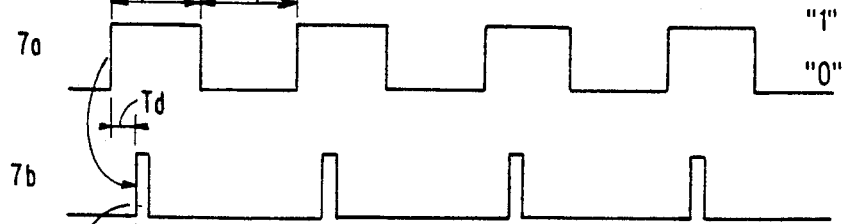
PRIOR ART
FIG. 41d    14b
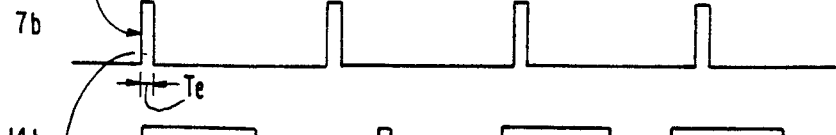
PRIOR ART
FIG. 41e    16c
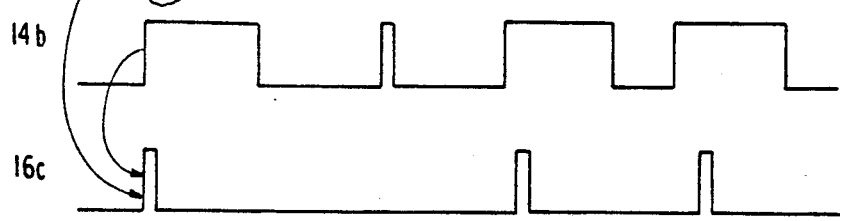
PRIOR ART
FIG. 41f    15b
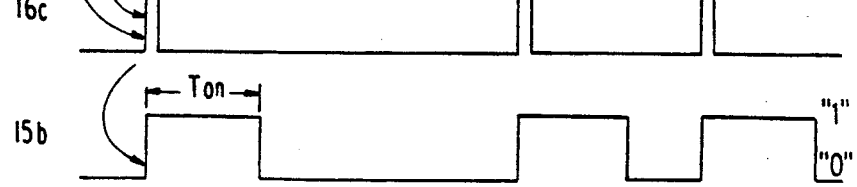
PRIOR ART
FIG. 41g    ig

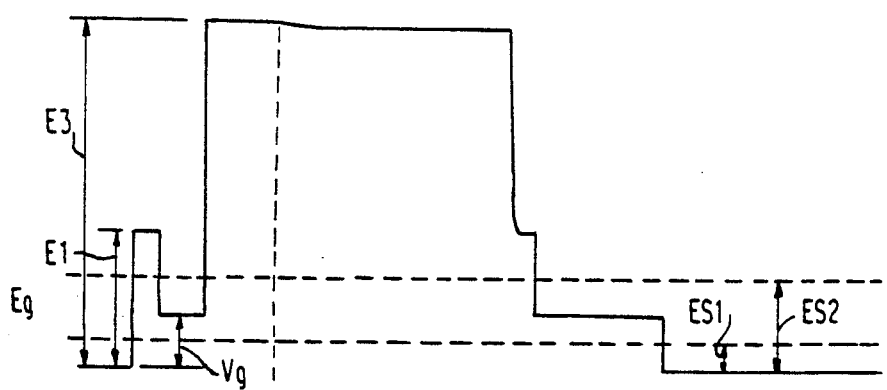
PRIOR ART
FIG. 42 a
PRIOR ART
FIG. 42 b
PRIOR ART
FIG. 42 c
PRIOR ART
FIG. 42 d
PRIOR ART
FIG. 42 e
PRIOR ART
FIG. 42 f
PRIOR ART
FIG. 42 g
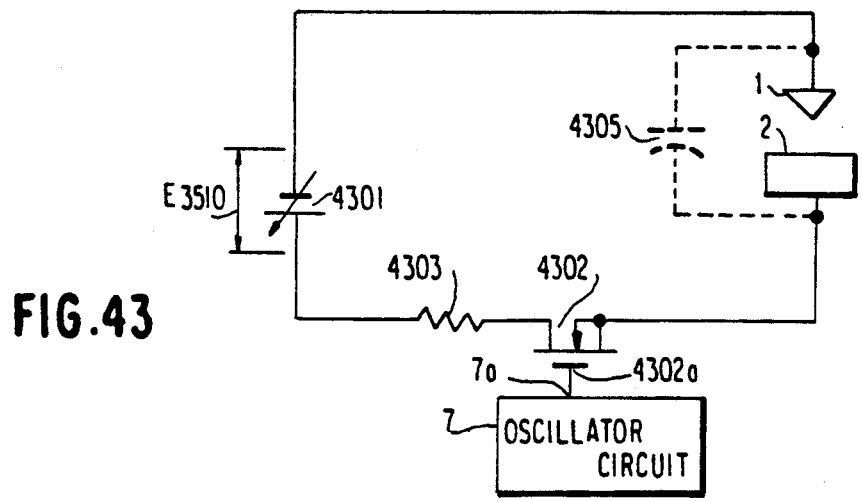
FIG. 43

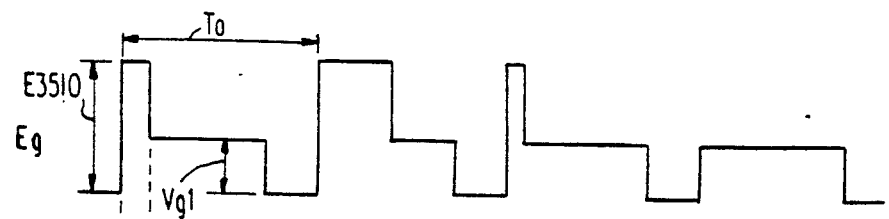
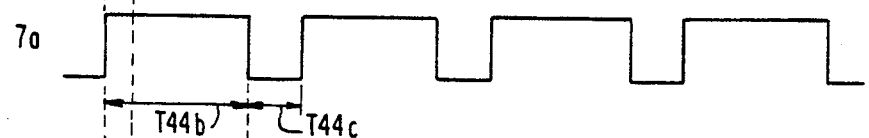
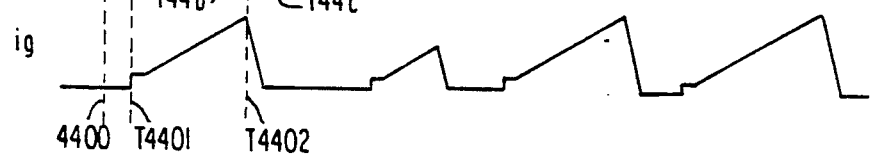
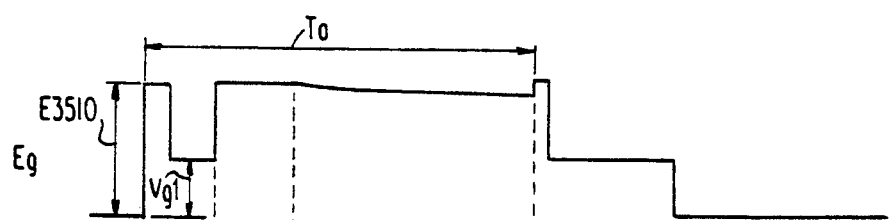
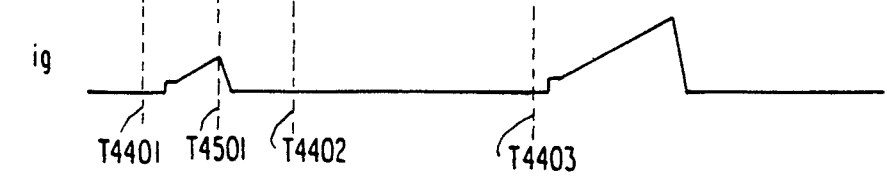
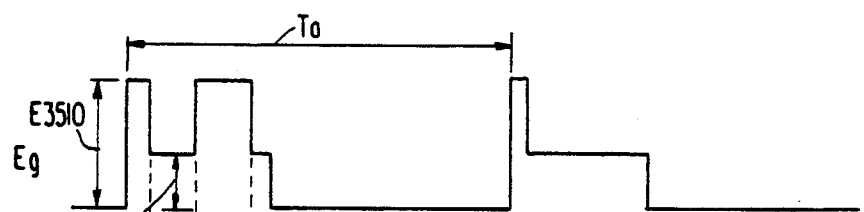
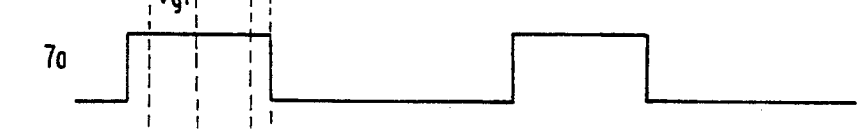
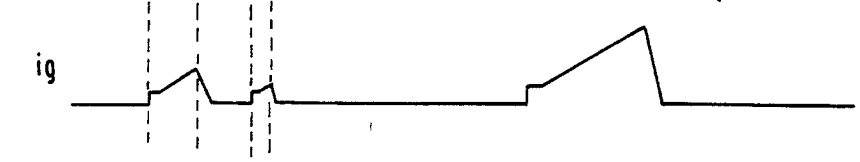

ELECTRICAL DISCHARGE MACHINE WITH MACHINING GAP VOLTAGE CONTROL

BACKGROUND OF THE INVENTION

1. Field of the Invention

The present invention relates to an electrical discharge machine, or the like, which cuts a workpiece through proper control of a gap between the workpiece and an electrode. In particular, the present invention precisely controls the average machining gap voltage between an electrode and a workpiece.

2. Description of the Related Art

FIG. 39 is a circuit diagram of a conventional electrical discharge machine. Electrode 1 is connected to the positive pole of diode 4, and the negative pole of diode 4 is connected to the negative pole of first direct-current power supply 3. The positive pole of the first direct-current power supply 3 is connected to one end of current limiting resistor 5, and the other end of the current limiting resistor 5 is connected to the positive pole of semiconductor switch 6. The negative pole of semiconductor switch 6 is connected to the workpiece 2. Output terminal 7a of oscillator circuit 7 is connected to control terminal 6a of semiconductor switch 6 so as to control operation of semiconductor switch 6.

FIG. 40 illustrates detailed oscillator circuit 7, which consists of clock pulse generator 4001, two-input OR circuits 4002–4004, flip-flop 4007, on-time counter 4008, off-time counter 4009, on-time setter 4010 for setting the length of time when output terminal signal 7a of oscillator circuit 7 is set to "1," and off-time setter 4011 for setting the length of time when output terminal 7a of oscillator circuit 7 is set to "0". On-time setter 4010 has output terminals identical in number to the bits of on-time counter 4008, and off-time setter 4011 has output terminals identical in number to the bits of off-time counter 4009. First match comparator circuit 4012 has two sets of compared data input terminals identical in number to the bits of on-time counter 4008. The output terminals of on-time setter 4010 are connected to the corresponding compared data input terminals on one side of first match comparator circuit 4012, and the output terminals of on-time counter 4008 are connected to the corresponding compared data input terminals on the other side thereof.

First match comparator circuit 4012 compares on-time data set in on-time setter 4010 and the value of the on-time counter 4008, and outputs "1" to output terminal 4012a when they match, and outputs "1" to output terminal 4012b when the value of on-time counter 4008 reaches a predetermined set value.

Second match comparator circuit 4013 has two sets of compared data input terminals identical in number to the bits of off-counter 4009. The output terminals of off-time setter 4011 are connected to the corresponding compared data input terminals on one side of match comparator circuit 4013, and the output terminals of off-time counter 4009 are connected to the corresponding compared data input terminals on the other side thereof. Second match comparator circuit 4013 outputs "1" to output terminal 4013a when off-time data set in off-time setter 4011 matches the value of off-time counter 4009.

N-output terminal 4007a of flip-flop 4007 is connected to one input terminal of two-input AND circuit 4005 and also to output terminal 7a of oscillator circuit 7. The other input terminal of two-input AND circuit 4005 is connected to output terminal 4001a of clock pulse generator 4001. Further, the output terminal of two-input AND circuit 4005 is connected to count input terminal 4008a of on-time counter 4008.

C-output terminal 4007b of flip-flop 4007 is connected to one input terminal of two-input AND circuit 4006 and the other input terminal of two-input AND circuit 4006 is connected to output terminal 4001a of clock pulse generator 4001. The output terminal of two-input AND circuit 4006 is connected to count input terminal 4009a of off-time counter 4009.

Output terminal 4012a of match comparator circuit 4012 is connected to one input terminal of two-input OR circuit 4003 and also to one input terminal of two-input OR circuit 4002. Further, the output terminal of two-input OR circuit 4002 is connected to R-input terminal 4007c of flip-flop 4007 and the output terminal of two-input OR circuit 4003 is connected to reset input terminal 4008b of on-time counter 4008.

The output terminal 4013a of match comparator circuit 4013 is connected to one input terminal of two-input OR circuit 4004 and also to S-input terminal 4007d of flip-flop 4007. Further, the output terminal of two-input OR circuit 4004 is connected to reset input terminal 4009b of off-time counter 4013.

Reset terminal 7d of oscillator circuit 7 is connected to the other input terminal of two-input OR circuit 4002, the other input terminal of two-input OR circuit 4003, and the other input terminal of two-input OR circuit 4004. Further, output terminal 4012b of match comparator circuit 4012 is connected to output terminal 7b of oscillator circuit 7.

The operation of oscillator circuit 7 illustrated in FIG. 40 will now be described.

First, assume that flip-flop 4007 has been reset, C-output terminal 4007b signal of the flip-flop 4007 is "1", and N-output terminal 4007a signal is "0". Since a clock pulse of a predetermined cycle is always output to output terminal 4001a of clock pulse generator 4001, the clock pulse is input to count input terminal 4009a of on-time counter 4009 via two-input AND circuit 4006. Every time the clock pulse is input, off-time counter 4009 counts up. When the value of off-time counter 4009 has become equal to that stored in off-time setter 4011, i.e. the off-time data, output terminal 4013a of match comparator circuit 4013 is set to "1", causing reset input terminal 4009b of off-time counter 4009 to be set to "1" via two-input OR circuit 4004, thereby resetting off-time counter 4009. At the same time, flip-flop 4007 is set.

When flip-flop 4007 is set, C-output terminal 4007b of the flip-flop 4007 is set to "0" and the N-output terminal 4007a is set to "1". Accordingly, the clock pulse is not output to the output terminal of two-input AND circuit 4006 and off-time counter 4009 stops counting. However, the clock pulse is now output to the output terminal of two-input AND circuit 4005 and on-time counter 4008 starts counting each pulse.

When the value of the on-time counter 4008 has reached a predetermined set value, a pulse is output to output terminal 4012b of match comparator circuit 4012. This pulse is then output to the output terminal 7b of oscillator circuit 7. On-time counter 4008 further continues counting, and when its value has become equal to the on-time data stored in on-time setter 4010, output terminal 4012a of match comparator circuit 4012 is set to "1". Accordingly, reset input terminal 4008b of on-time counter 4008 is set to "1" via two-input OR circuit 4003, causing the on-time counter 4008 to be reset. Also, R-input terminal 4007c signal of flip-flop 4007 is set to "1" via two-input OR circuit 4002, thereby resetting flip-flop 4007. Hence, on-time counter 4008, off-time counter 4009 and flip-flop 4007 are all reset, to the above-mentioned initial conditions.

Since the aforementioned operation is repeated cyclically, a pulse which is "1" during the on-time counting of on-time setter 4010 and is "0" during off-time counting of off-time setter 4011 is output to the output terminal 7a of the oscillator circuit 7. At a predetermined period of time after output terminal 7a has changed to "1", the pulse is output to output terminal 7b.

Flip-flop 4007 is reset by sending a reset pulse to reset terminal 7d of oscillator circuit 7 after flip-flop 4007 has been set. C-output terminal 4007b of flip-flop 4007 is connected to output terminal 7c of the oscillator circuit 7.

Referring to FIG. 39, diode 8 is connected at its negative pole to third direct-current power supply 9 having an output voltage E3. Third switch circuit 10, e.g., a semiconductor switch, is connected at its positive pole with the other pole of third direct-current power supply 9. The positive pole of diode 8 is connected to electrode 1. The negative pole of semiconductor switch 10 is connected to workpiece 2. One end of voltage dividing resistor 11 is connected to electrode 1, the other end thereof is connected to one end of voltage dividing resistor 12. The other end of the voltage dividing resistor 12 is connected to the workpiece 2. Input terminal 13a of differential amplifier 13 is connected to connection point 12a between voltage dividing resistors 11 and 12, and input terminal 13b of differential amplifier 13 is connected to workpiece 2. Output terminal 13c of differential amplifier 13 is connected to input terminal 14a of discharge detector circuit 14.

One input terminal 16a of two-input AND circuit 16 is connected to output terminal 7b of oscillator circuit 7 and the other input terminal 16b thereof is connected to output terminal 14b of discharge detector circuit 14. Output terminal 16c of two-input AND circuit 16 is connected to input terminal 15a of one-shot multivibrator 15. Output terminal 15b of one-shot multivibrator 15 is connected to control terminal 10a of semiconductor switch 10. Capacitor 17 extends across electrode 1 and workpiece 2 is indicated by dashed lines.

The operation of the circuit shown in FIG. 39 will now be described in reference to the operation timing chart in FIG. 41.

Oscillator circuit 7 oscillates at a predetermined cycle Ta and outputs a voltage having a waveform shown in FIG. 41b, to output terminal 7a. This voltage is a pulse which is "1" for a period of Tb and "0" for a period of Tc. The pulse is applied to control terminal 6a of semiconductor 6 so as to turn semiconductor switch 6 on for a period Tb and off for a period Tc. When semiconductor switch 6 is on, voltage E1 of first direct-current power supply 3 is applied to a gap between the electrode 1 and workpiece 2 hereinafter referred to as the "machining gap" via current limiting resistor 5 and diode 4 to start an electrical discharge.

The waveform shown in FIG. 41a indicates a voltage across the machining gap hereinafter referred to as "machining gap voltage" Eg. From a time when semiconductor switch 6 is turned on to when the discharge is started, the machining gap voltage Eg is equivalent to the voltage of the first direct-current power supply 3.

Subsequently, machining gap voltage Eg reduces as the discharge begins, and eventually is equal to predetermined voltage Vg.

Since a voltage proportional to machining gap voltage Eg develops across voltage dividing resistor 12, the output voltage of the differential amplifier 13 is also proportional to machining gap voltage Eg. This voltage is input to the input terminal 14a of discharge detector circuit 14. In accordance with this voltage, discharge detector circuit 14 determines whether or not the machining gap voltage Eg is between first preset voltage ES1 and second preset voltage ES2. If the machining gap voltage Eg is between first preset voltage ES1 and second preset voltage ES2, the discharge detector circuit 14 determines that a discharge has occurred and outputs a "1" at output terminal 14b. If machining gap voltage Eg is not between first preset voltage ES1 and second preset voltage ES2, the discharge detector circuit 14 determines that a discharge has not occurred and outputs a "0" at output terminal 14b.

FIG. 41d shows the voltage waveform of output terminal 14b and FIG. 41c shows the waveform of voltage output to output terminal 7b of the oscillator circuit 7. The voltage waveform of output terminal 7b is a pulse waveform which rises a predetermined period of time Td after the rise of output terminal 7a of oscillator circuit 7 and falls in a predetermined length of time Te.

FIG. 41e illustrates the waveform of a voltage output to output terminal 16c of two-input AND circuit 16 which results from the input of output terminal 7b of oscillator circuit 7 shown in FIG. 41c and output terminal 14b of discharge detector circuit 14 shown in FIG. 41d into the corresponding input terminals of two-input AND circuit 16.

The voltage signal shown in FIG. 41e is input to input terminal 15a of one-shot multivibrator 15. A voltage signal shown in FIG. 41f which is set to "1" on the leading edge of the voltage in FIG. 41e and returns to "0" in predetermined time Ton is output to output terminal 15b of the one-shot multivibrator 15. The voltage signal in FIG. 41f is input to control terminal 10a of the semiconductor switch 10 and turns semiconductor switch 10 on when the voltage in FIG. 41f is "1". When semiconductor switch 10 is turned on, third direct-current power supply 9 is connected to the already discharging machining gap via semiconductor switch 10 and diode 8. At this time, third direct-current power supply 9 causes a discharge current to flow in the machining gap.

FIG. 41g shows the waveform of a current which flows in the machining gap. This current waveform is shaped like a saw tooth wave which increases at a predetermined slope, when either of semiconductor switches 6 or 10 are on, and falls when both semiconductor switches 6 and 10 are turned off. The current changes at a predetermined slope without changing sharply as shown in FIG. 41g because there is an inherent inductance (not illustrated) in the circuit. Output voltage E3 of third direct-current power supply 9 is ordinarily higher than the output voltage E1 of the first direct-current power supply 3 so that a larger current may flow when semiconductor switch 10 is on.

If, for example, the discharge is stopped for some reason while semiconductor switch 10 is on, output voltage E3 of third direct-current power supply 9 is applied to the machining gap, raising machining gap voltage Eg. In addition, even after the semiconductor switches 6 and 10 are turned off, stray capacity 17, having a typical magnitude of several thousand to ten thousand PF, causes machining gap voltage Eg to remain high.

FIG. 42 is an operation timing chart where the discharge has been stopped when semiconductor switch 10 is on. FIGS. 42a to 42g indicate voltage and current waveforms measured at the same points as in FIGS. 41a to 41g respectively. In FIG. 42, $T_0$ indicates a point when semiconductor switch 10 is turned on. $T_1$ indicates a point when the discharge has stopped while semiconductor switch 10 is on, and $T_2$ a point when semiconductor switch 10 turns off after the point $T_1$. $T_3$ indicates a point when output terminal 7a signal of oscillator circuit 7 is set to "1" again and semiconductor switch 6 turns on after the point $T_2$. $T_4$ indicates a point when semiconductor switch 10, having turned on at the point $T_3$, turns off. In FIG. 42, the waveforms in FIGS. 42a to 42f prior to the point $T_1$ are similar to those shown in FIG. 41.

When a discharge stop occurs at point $T_1$, the current shown in FIG. 42g quickly drops to zero and machining gap voltage Eg shown in FIG. 42a rises to output voltage $E_3$ of third direct-current power supply 9. Also, the voltage shown in FIG. 42f automatically returns to zero at point $T_2$ a predetermined length of time Ton after rising, as shown in FIG. 41f. From point $T_2$ to point $T_3$, the voltage in FIG. 42a is kept as high as output voltage $E_3$ of third direct-current power supply 9 by stray capacitance 17.

At point $T_3$, output terminal 7a of oscillator circuit 7 is set to "1" and semiconductor switch 6 is turned on to begin the next discharge operation. The waveforms indicating the operation after point $T_3$ are similar to those shown in FIG. 41 which correspond to a normal discharge operation.

As illustrated in FIG. 42a, when a high voltage is applied to the machining gap because of a discharge termination occurring while semiconductor switch 10 is on, the average voltage in the machining gap quickly rises.

Meanwhile, a positive average voltage applied to the machining gap (hereinafter referred to as the "average machining voltage") is kept constant to maintain the machining gap conditions required for electrical discharge machining. Namely, when the average machining voltage is higher than a predetermined value, the machining gap is decreased to reduce the average machining voltage. When it is lower than the predetermined value, the machining gap is increased to raise the average machining voltage. This is achieved by moving a table holding workpiece 2 or an electrode support holding electrode 1 during machining.

Since a positive voltage is only applied to the machining gap in the discharge circuit shown in FIG. 39, the aforementioned average machining gap voltage is identical to the above described average machining voltage.

When a high voltage develops in the machining gap due to a discharge stop while semiconductor switch 10 is on, the average machining voltage rises to at least a voltage equivalent to the machining gap voltage, causing the control for maintaining the machining gap constant to be faulty. That is, the machining gap decreases abnormally and a centralized discharge is generated. Such a centralized discharge can damage electrode 1 and workpiece 2 and reduce machining accuracy.

Another method of maintaining the machining gap constant, without using the average machining voltage, may be carried out according to the length of no-load time between the turning on of semiconductor switch 6 and a discharge start. This method, however, cannot be employed for an electrical discharge machine which has a large stray capacity 17 and whose dielectric is relatively conductive. This is so because current limiting resistor 5 used in such a machine requires a long time from when semiconductor switch 6 is turned on to when machining gap voltage Eg rises, and machining gap voltage Eg falls below voltage $E_1$.

Unlike the discharge circuit of the conventional electrical discharge machine shown in FIG. 39 employing two power supplies, some electrical discharge machines known in the art have only one power supply. FIG. 43 is a discharge circuit diagram of such an electrical discharge machine.

Electrode 1 is connected to the negative pole of first direct-current power supply 4301, the positive pole of first direct-current power supply 4301 is connected to one end of current limiting resistor 4303, the other end of the current limiting resistor 4303 is connected to the positive pole of semiconductor switch 4302, and the negative pole of semiconductor switch 4302 is connected to workpiece 2. Output terminal 7a of the oscillator circuit 7 is connected to control terminal 4302a of semiconductor switch 4302.

The operation of the discharge circuit illustrated in FIG. 43 will be described with reference to the operation timing chart shown in FIG. 44.

A pulse, alternately repeating over a period T44b when the output is "1" and a period T44c when the output is "0" as shown in FIG. 44b, is output to output terminal 7a of the oscillator circuit 7. This pulse is input to control terminal 4302a of semiconductor switch 4302 to keep semiconductor switch 4302 on during period T44b and off during period T44c.

FIG. 44a shows the waveform of machining gap voltage Eg which rises to voltage E3510 on a leading edge T4400 of the waveform in FIG. 44b, falls to a voltage Vg1 at a discharge start point T4401, and finally falls to zero on trailing edge T4402 of the waveform in FIG. 44b.

FIG. 44c shows the waveform of discharge current. In this waveform, the current increases at a predetermined slope, starting at point T4401 and decreases to zero at sharp slope, starting at point T4402.

While the operation timing chart shown in FIG. 44 illustrates an ordinary operating state, FIG. 45 is an operation timing chart illustrating an operation where a discharge stop has taken place for some reason at a point T4501 between points T4401 and T4402 and the discharge is not resumed even at point T4402.

Machining gap voltage Eg is held at almost the voltage E3510 between point T4402 and point T4403 when output terminal 7a of oscillator circuit 7 is set to "1" again. Such a high voltage is maintained because electrical charges are accumulated due to inherent stray capacitance 4305 of the machining gap. Since machining gap voltage Eg is high between points T4402 and T4403, the average machining voltage is different from that in the case where the no-load time occurs once per predetermined cycle as shown in FIG. 44. Thus, normal machining gap control is not carried out.

FIG. 46 shows a case where the discharge is resumed at point T4601 before point T4402 after a discharge stop has taken place at point T4501 in FIG. 45. Since the no-load time is between points T4501 and T4601 in this case, the no-load time of high machining gap voltage Eg occurs twice in one cycle. Hence, the average machining voltage rises abnormally and machining gap control is not conducted normally in this case, either.

In the conventional electrical discharge machine constructed as described above, if a discharge stops for some reason, a high machining voltage occurs in the machining gap and the average machining voltage rises abnormally. At this time, the machining gap controlled in accordance with the average machining voltage decreases abnormally, generating a centralized discharge, possibly damaging electrode 1 and workpiece 2 and reducing machining accuracy.

SUMMARY OF THE INVENTION

It is, accordingly, an object of the present invention to overcome the disadvantages in the prior art by providing an electrical discharge machine which controls the machining gap voltage accurately and consistently so as to allow high-speed machining to be performed with a high accuracy.

The above-mentioned are accomplished by controlling the average voltage between the workpiece and the electrode. According to one aspect of the invention, an additional power supply is provided to apply an inverse voltage between the electrode and workpiece so as to control the average machining gap voltage when a discharge process is interrupted.

Also, the present invention provides for controlling the application time of an inverse voltage across the machining gap. Finally, a discharge stop detecting circuit is utilized to trigger the above-mentioned devices for controlling average machine gap voltage. By setting the average voltage to a predetermined value, electrolyte corrosion and magnetization of the workpiece is minimized.

BRIEF DESCRIPTION OF THE DRAWINGS

FIGS. 4a, 4b, 4c, 4d, 4e, 4f, 4g, 4h and 4i are operation timing charts of the discharge circuit shown in FIG. 3;

FIGS. 6a, 6b, 6c, 6d, 6e, 6f, 6g, and 6h, and FIGS. 7a, 7b, 7c, 7d, 7e, 7f, 7g, and 7h are operation timing charts of the discharge circuit FIG. 5;

FIG. 12 is a detailed diagram of an interface circuit shown in FIG. 11;

FIGS. 13a, 13b, 13c, 13d, 13e, 13f and 13g are operating timing charges of the interface circuit shown in FIG. 12;

FIGS. 14a, 14b, 14c, 14d, 14e, 14f, 14g, and 14h and 15a, 15b, 15c, 15d, 15e, 15f, 15g, and 15h are operation timing charges of the discharge circuit shown in FIG. 11;

FIGS. 18a, 18b, 18c, 18d, 18e, 18f and 18g are operation timing charges of the interface circuit shown in FIG. 17.

FIGS. 19a, 19b, 19c, 19d, 19e, 19f, 19g, 19h and 19i are operation timing charts of the discharge circuit 16.

FIG. 21 is a detailed diagram of an interface circuit shown in FIG. 20.

FIGS. 22a, 22b, 22c, 22d, 22e, 22f, 22g, and 22h are operation timing charts of the interface circuit shown in FIG. 21.

FIGS. 26a, 26b, 26c, 26d, 26e, 26f, 26g, and 26h are operation timing chart of the interface circuit shown in FIG. 25.

FIGS. 27a, 27b, 27c, 27d, 27e, 27f, 27g, and 27h and FIGS. 28a, 28b, 28c, 28d, 28e, 28f, 28g, and 28h are operation timing charts of the discharge circuit shown in FIG. 24.

FIGS. 29a, 29b, 29c, 29d are timing charts illustrating the machining gap voltage of an electrical discharge machine according to a further embodiment of the present invention.

FIGS. 36a, 36b, 36c and 36d are operation timing charts of the discharge circuit shown in FIG. 35.

FIGS. 38a, 38b, 38c, 38d, 38e and 38f are operation timing charges of the discharge circuit shown in FIG. 37;

FIG. 39 is a discharge circuit diagram of a electrical discharge machine;

FIG. 40 is a detailed diagram of an oscillator circuit shown in FIG. 39;

FIGS. 41a, 41b, 41c, 41d, 41e, 41f and 41g and FIGS. 42a, 42b, 42c, 42d, 42e, 42f and 42g are operation timing charts of the discharge circuit shown in FIG. 40;

FIG. 43 is a discharge circuit diagram of an electrical discharge machine;

FIGS. 44a, 44b and 44c, FIGS. 45a, 45b and 45c, and FIGS. 46a, 46b and 46c are operation timing charts of the discharge circuit shown in FIG. 43.

DETAILED DESCRIPTION OF THE PREFERRED EMBODIMENTS

Figure 1:
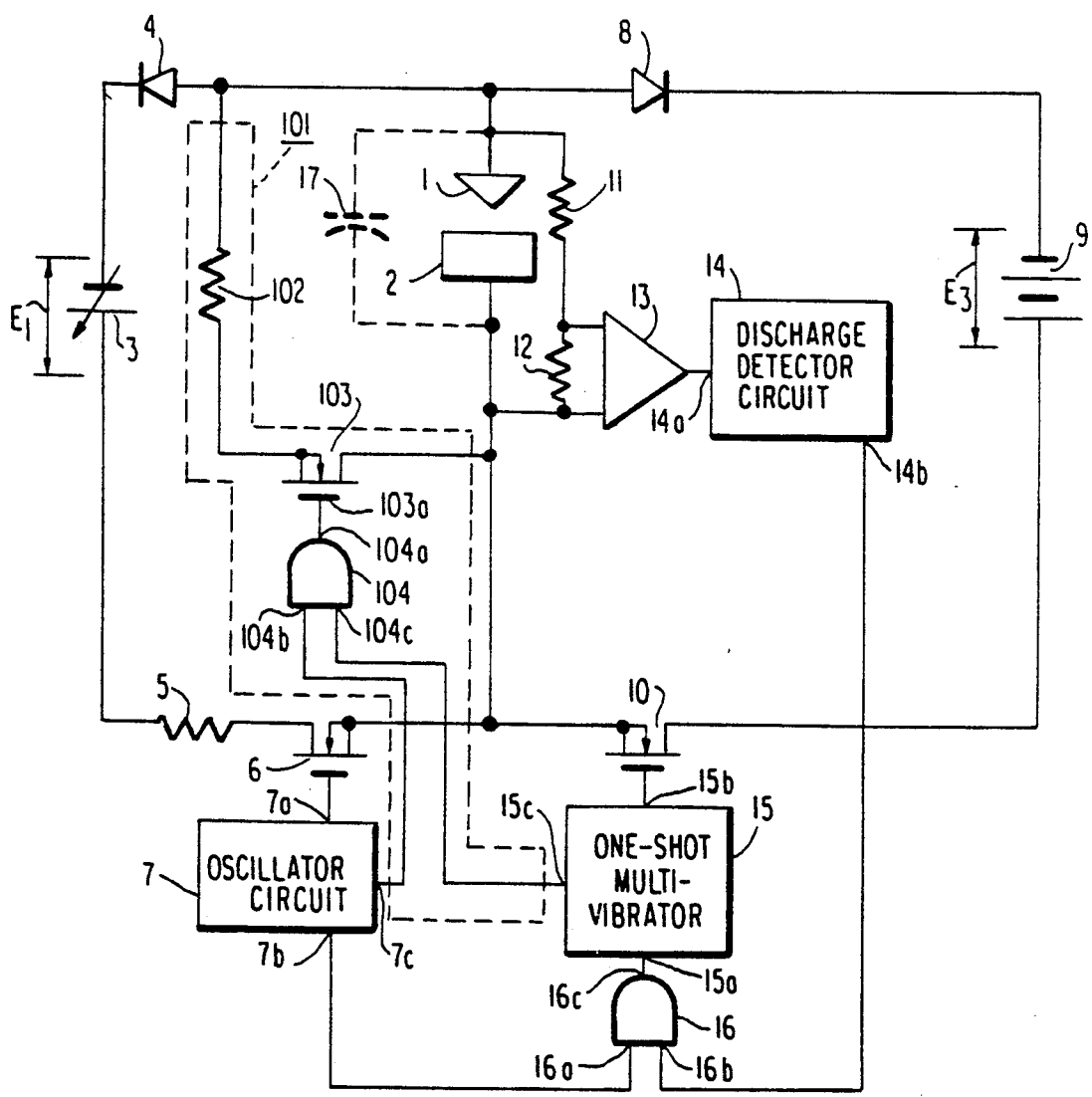
FIG. 1 is a discharge circuit diagram of an electrical discharge machine illustrating the first embodiment of the present invention.

FIG. 1 is a circuit diagram illustrating the first preferred embodiment of the present invention. Voltage controlling means 101 is provided for setting machining gap voltage Eg to 0 V when semiconductor switches 6 and 10 are turned off and a voltage is not being applied to the machining gap in accordance with the first direct-current power supply 3 and third direct-current power supply 9, e.g. it constitutes a bypass circuit. The circuit in FIG. 1 is similar to the discharge circuit of the conventional electrical discharge machine shown in FIG. 39, with the exception that it is provided with bypass circuit 101.

A series circuit of resistor 102 and semiconductor switch 103 is connected between electrode 1 and workpiece 2. Two-input AND circuit 104, has output terminal 104a connected to control terminal 103a of semiconductor switch 103. One input terminal 104b of two-input AND circuit 104 is connected to output terminal 7c of the oscillator circuit 7 and the other input terminal 104c is connected to output terminal 15c of one-shot multivibrator 15.

Bypass circuit 101 comprises resistor 102, semiconductor switch 103 and two-input AND circuit 104. The inverse signal of output terminal 7a is output to output terminal 7c of oscillator circuit 7, and the inverse of output terminal 15b is output to output terminal 15c of one-shot multivibrator 15.

The operation of the bypass circuit 101 will now be described with reference to an operation timing chart in FIG. 2, which is similar to the operation timing chart of the discharge circuit for the known electrical discharge machine illustrated in FIG. 42, with the exception of machining gap voltage Eg during a period Toff when semiconductor switches 6 and 10 are off. Although machining gap voltage Eg during Toff, i.e. between the points $T_2$ and $T_3$, is held high in FIG. 42, it sharply decreases to zero after the point $T_2$ in FIG. 2. This is so because the electric charges accumulated due to stray capacity 17 are discharged via resistor 102 when semiconductor switch 103 is turned on. Therefore, the machining gap is controlled more accurately than in conventional devices because the average machining voltage is not abnormally raised. Whereas FIG. 2 assumes that the voltage E3 greater than voltage E1 voltage E3 may be equal to or lower than voltage E1.

Figure 3:
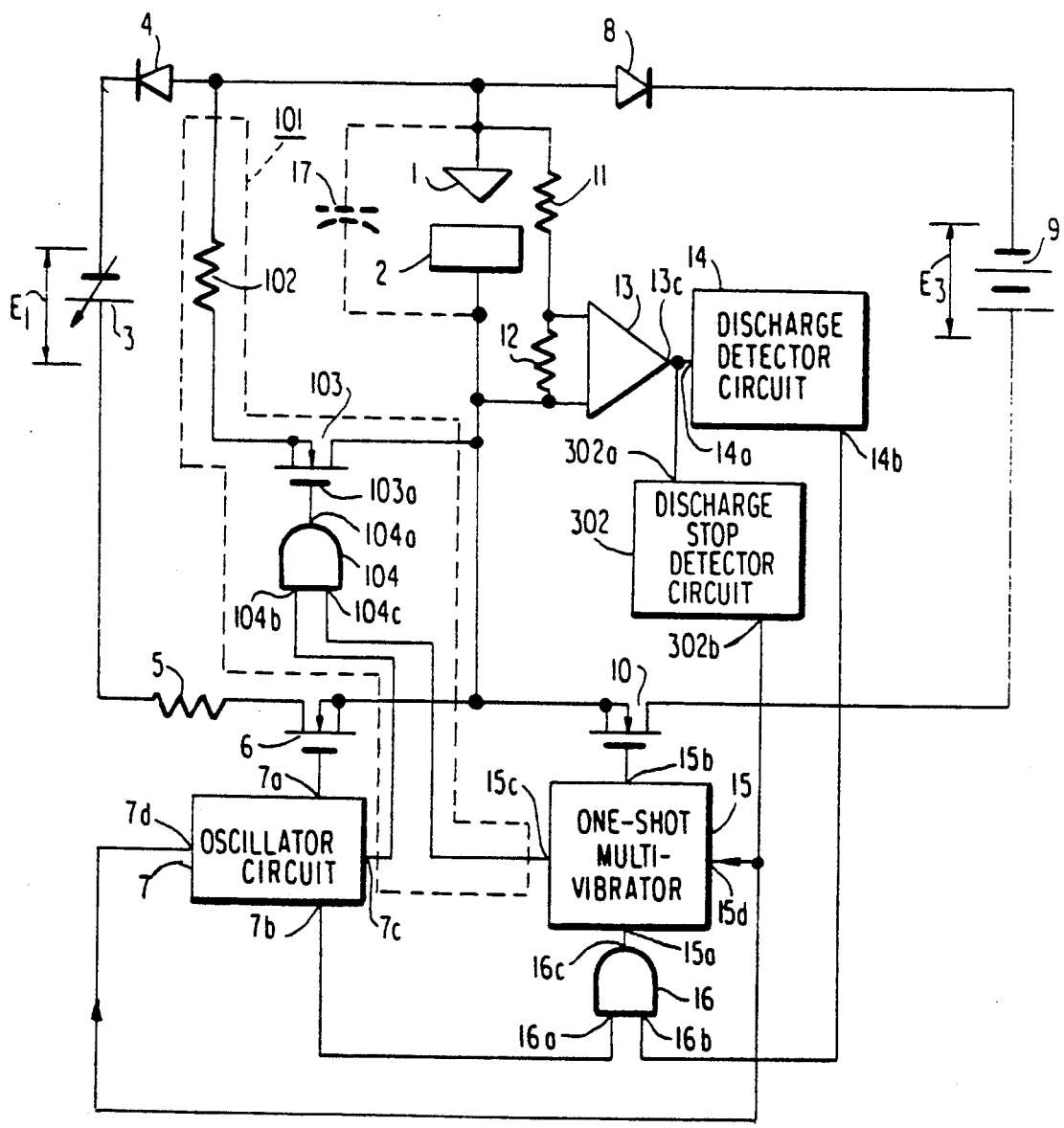
FIG. 3 is a discharge circuit diagram of an electrical discharge machine illustrating the second embodiment of the present invention.

A second preferred embodiment of the present invention is illustrated in FIG. 3, which is similar to FIG. 1 with the exception that it is provided with discharge stop detector circuit 302 for detecting a discharge stop.

Input terminal 302a of the discharge stop detector circuit 302 is connected to output terminal 13c of differential amplifier 13 and output terminal 302b of discharge stop detector circuit 302 is connected to input terminal 7d of oscillator circuit 7 and input terminal 15d of one-shot multivibrator 15.

The operation of discharge stop detector circuit 302 will now be described with reference to an operation timing chart in FIG. 4. Since voltage E1 of first direct-current power supply 3 is ordinarily lower than voltage E3 of third direct-current power supply 9, voltage determination level ES0, lower than the voltage E3 and slightly higher than voltage E1, is set at a determination level. When machining gap voltage Eg exceeds determination level voltage ES0, discharge stop detector circuit 302 is designed to output "1" to output terminal 302b. Accordingly, if a discharge stops while a voltage is applied to the machining gap by third direct-current power supply 9, "1" is output to output terminal 302b, output terminal 7a is kept at "0" until point $T_3$ and output terminal 115b of one-shot multivibrator 15 is also retained at "0" until it is triggered next.

Therefore, since "1" is output to both output terminal 7c of oscillator 7 and output terminal 15c of one-shot multivibrator 15 during the period from point T to point $T_3$, "1" is output to output terminal 104a of two-input AND circuit 104 and semiconductor switch 103 is turned on. Accordingly, the electric charges accumulated in stray capacitance 17 are discharged via resistor 102 and machining gap voltage Eg is reduced to zero.

As compared to the first embodiment, the second embodiment limits abnormal rises of the average machining voltage to an even greater degree so as to allow the machining gap to be controlled even more accurately.

A third preferred embodiment of the present invention will now be described with reference to FIG. 5, which is similar to FIG. 1, with the exception that second direct-current power supply 502 is provided in series with resistor 102 in bypass circuit 101. Second direct-current power supply 502, resistor 102, semiconductor switch 103 and two-input NAND circuit 104 comprise voltage control means, e.g. inverse-voltage application circuit 501.

Figure 2:
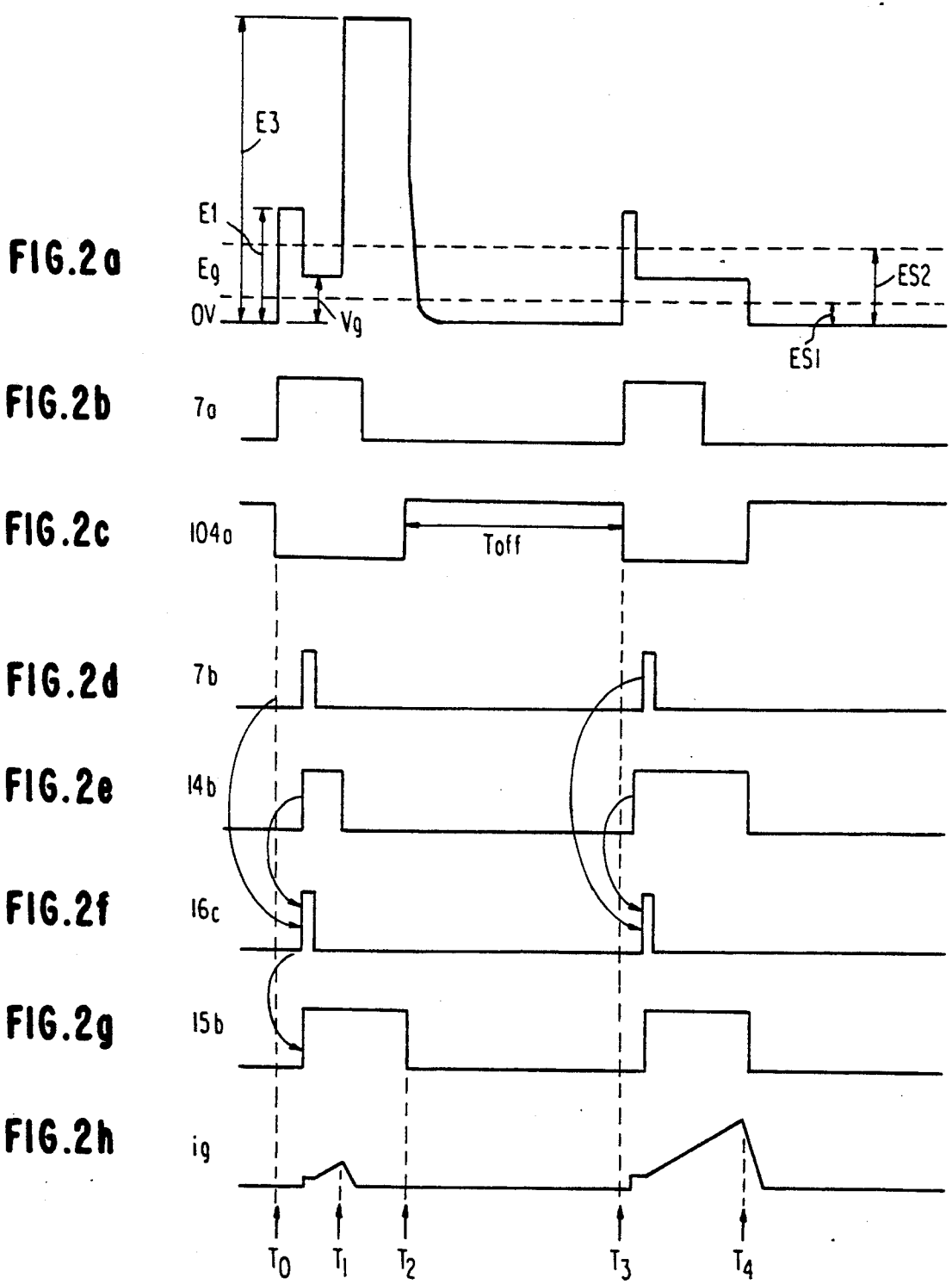
FIGS. 2a, 2b, 2c, 2d, 2e, 2f, 2g, and 2h are operation timing charts of the discharge circuit shown in FIG. 1.
Figure 5:
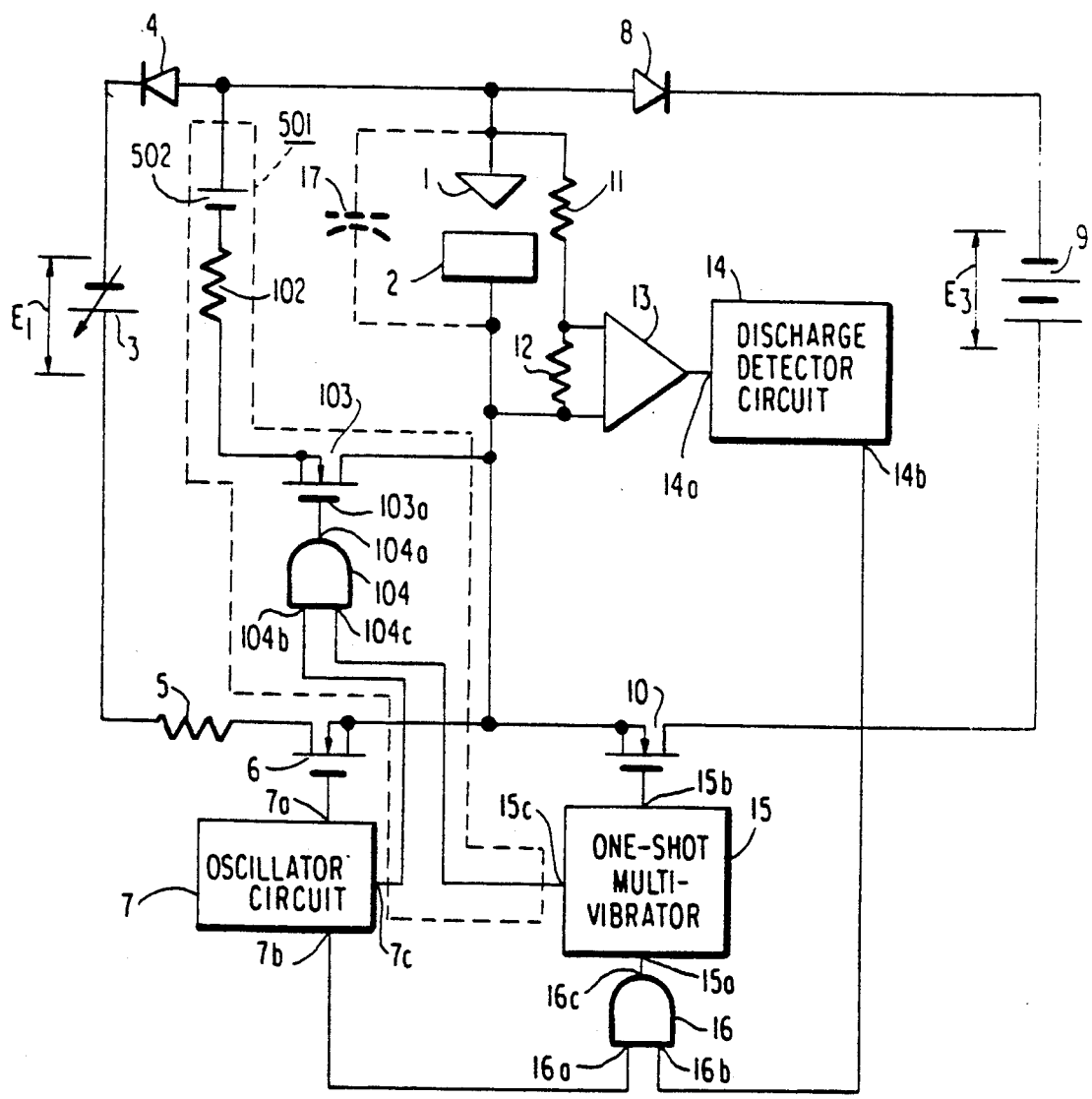
FIG. 5 is a discharge circuit diagram of an electrical discharge machine illustrating the third embodiment of the present invention.

FIG. 6 is an operation timing chart of the discharge circuit shown in FIG. 5, and is similar to the operation timing chart shown in FIG. 2, with the exception of machining gap voltage Eg while semiconductor switches 6 and 10 are off. In particular, while semiconductor switches 6 and 10 are off, inverse-voltage application circuit 501 causes machining gap voltage Eg to be equal in magnitude Vc to the output voltage of second direct-current power supply 502 and to be negative in polarity In this case, machining gap voltage Eg must be rectified to be zero while it is negative, using machining gap voltage Eg as it is, without finding the average machining voltage for controlling the machining gap distance.

Keeping the voltage of second direct-current power supply 502 lower than a dischargeable voltage allows prevention of a continuous arc discharge which is liable to occur in a negative direction.

FIG. 7 is an operation timing chart for the case where a discharge is not stopped for some reason, and is similar to FIG. 6 with the exception that machining gap voltage Eg remains at predetermined voltage Vg during the period from point $T_1$ to point $T_2$.

Figure 8:
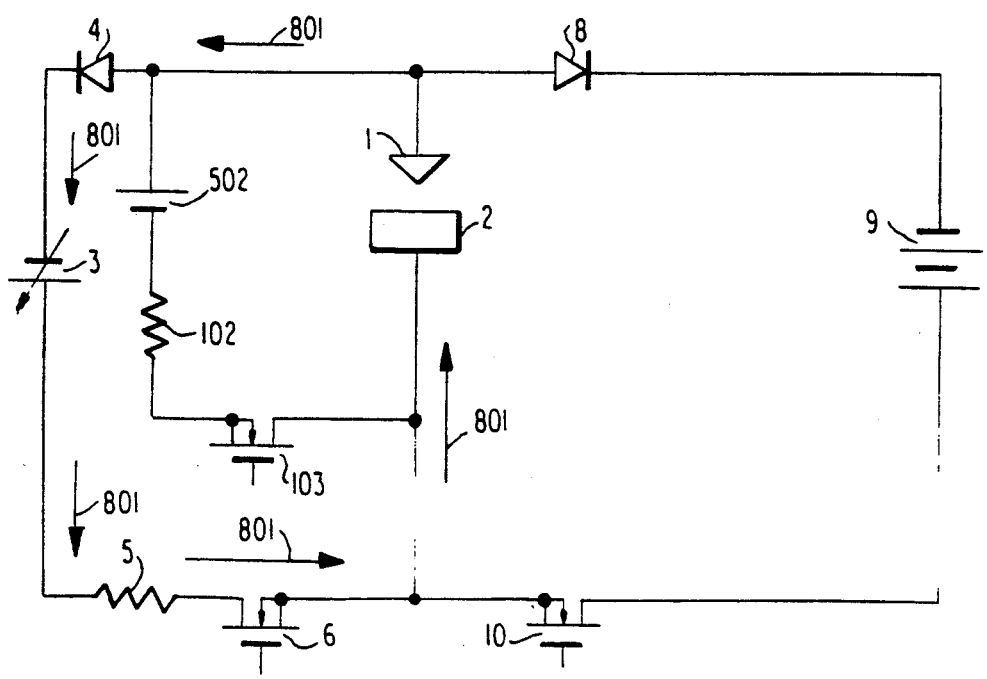
FIGS. 8, 9 and 10 illustrate current paths in the circuit of FIG. 5.
Figure 9:
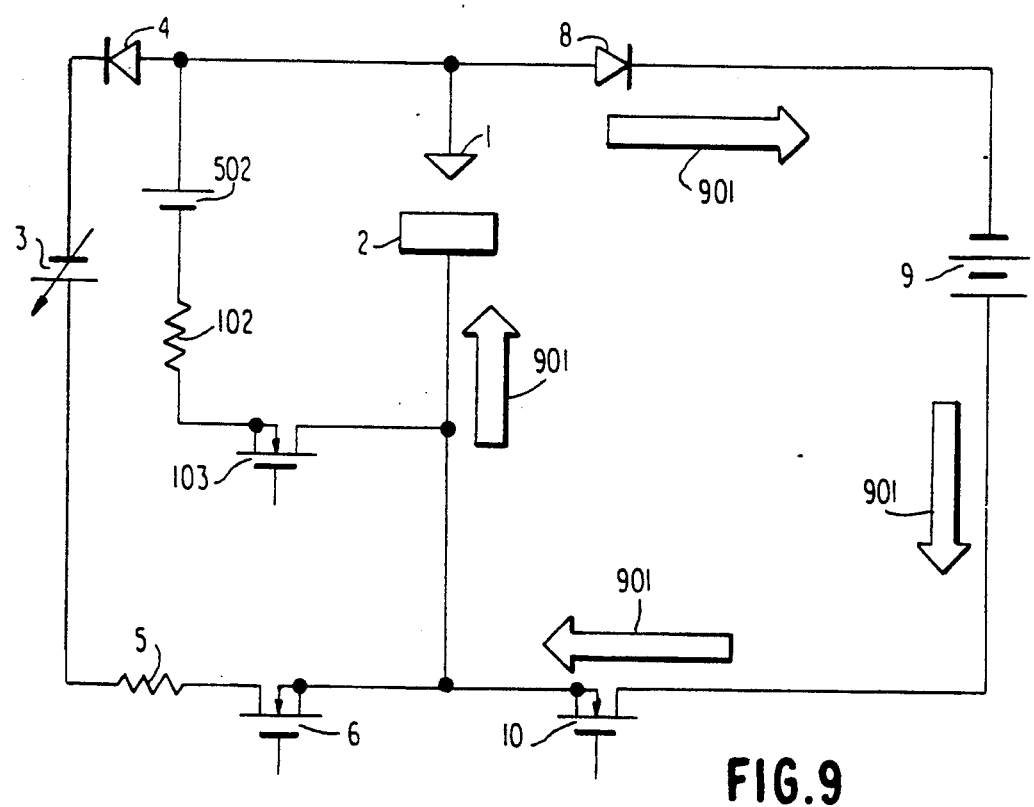
Figure 10:
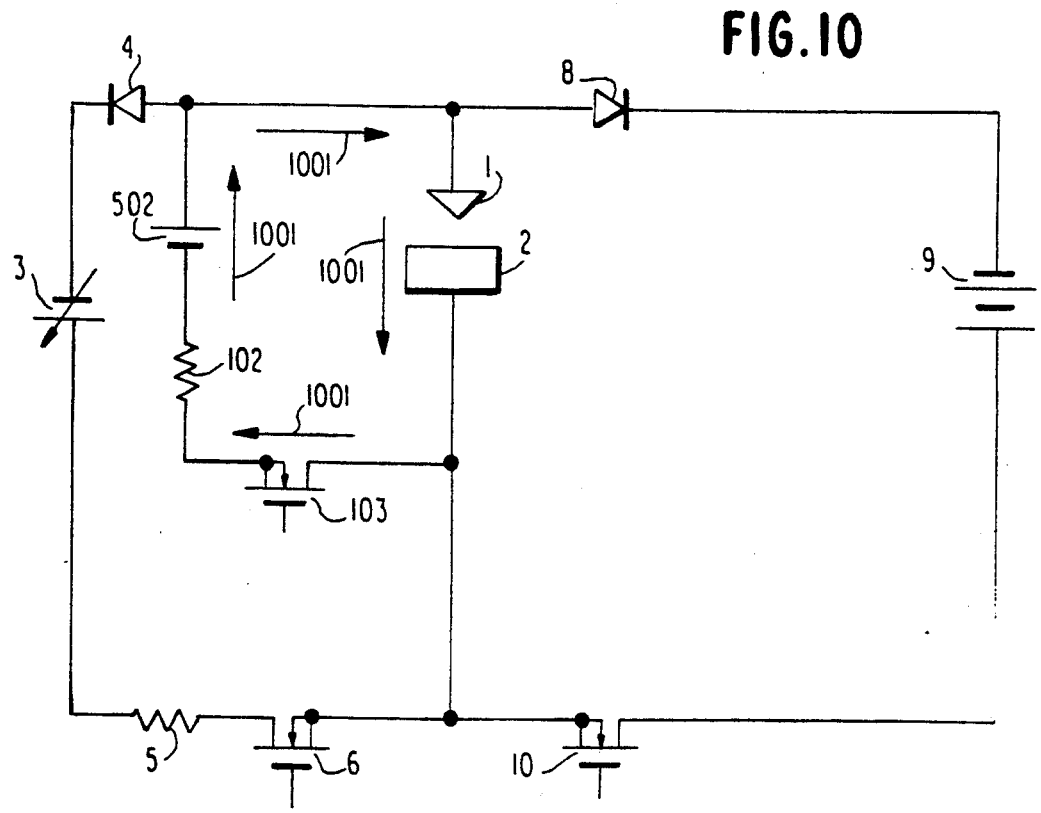

FIGS. 8 to 10 illustrate directions in which the current flows in the discharge circuit shown in FIG. 5. Arrows 801 in FIG. 8 indicate a direction in which the current flows when semiconductor switch 6 is on, arrows 901 in FIG. 9 indicate a direction in which the current flows when semiconductor switch 10 is on, and arrows 1001 in FIG. 10 indicate a direction in which the current flows when semiconductor switch 103 is on.

Since the third embodiment has a similar effect as the first embodiment and also causes a negative voltage, i.e. an inverse voltage, to be applied to the machining gap in addition to the ordinary positive voltage as shown in FIG. 7, it also prevents the surface configuration of workpiece 2 from being changed by electrolysis and electrolytic corrosion. The third embodiment also suppresses the magnetization of the workpiece 2.

Figure 11:
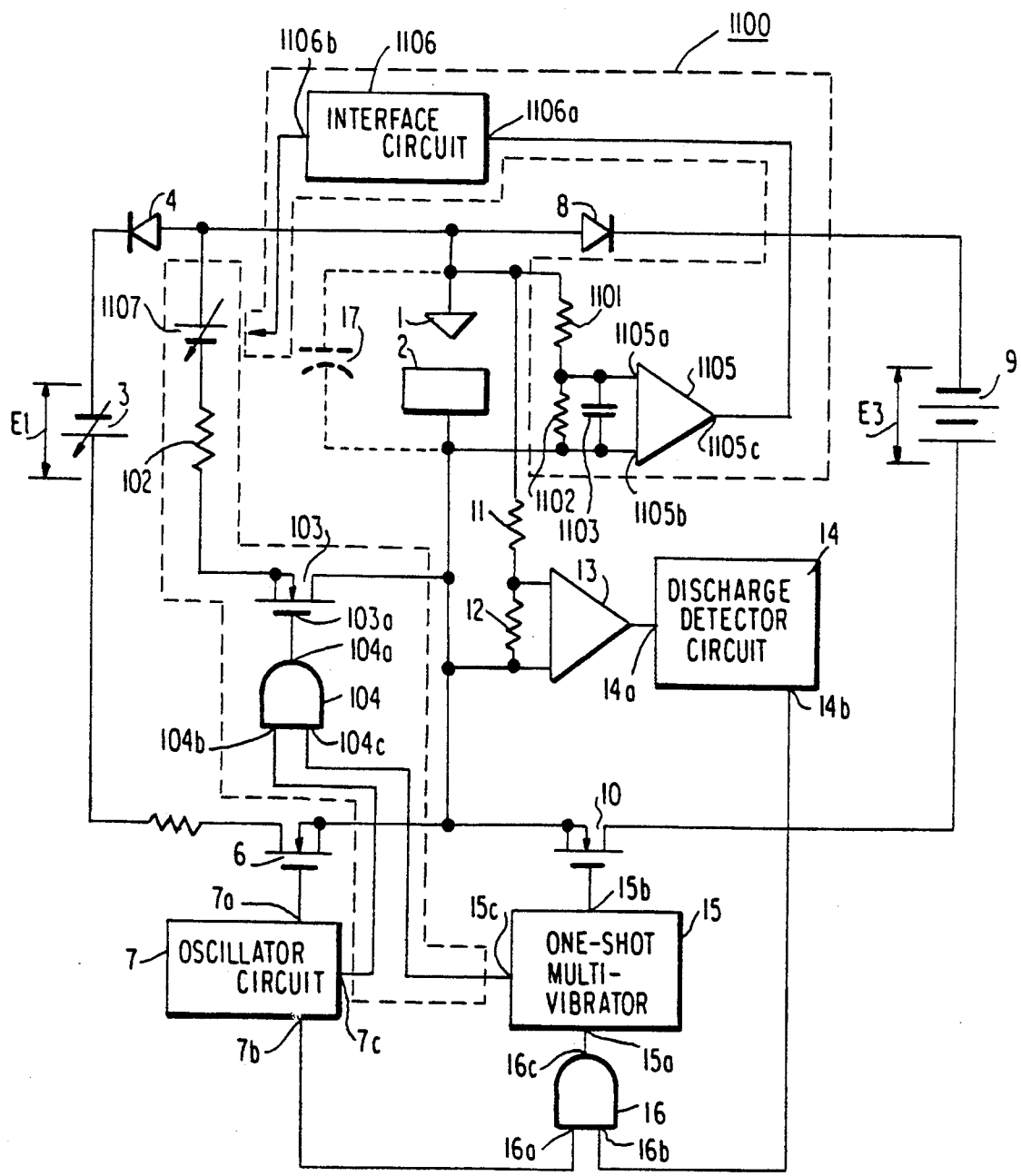
FIG. 11 is a discharge circuit diagram of an electrical discharge machine illustrating the fourth embodiment of the present invention.
Figure 14A:
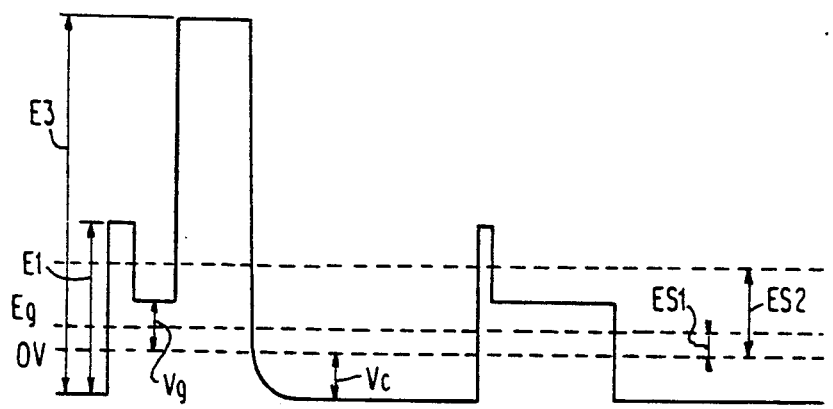
Figure 14B:
Figure 14C:
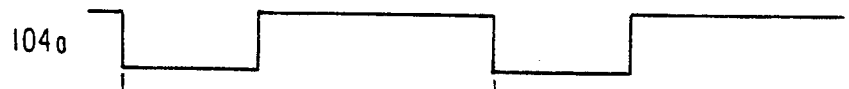
Figure 14D:
Figure 14E:
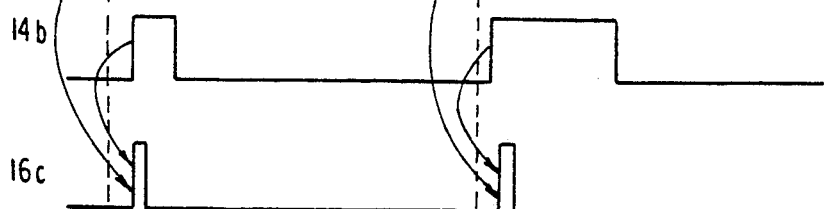
Figure 14F:
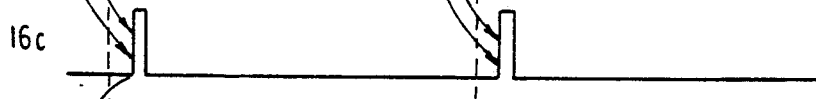
Figure 14G:
Figure 14H:
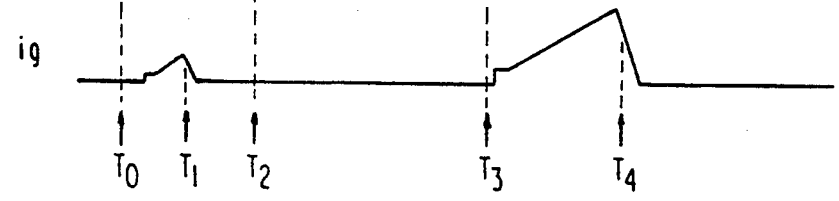

A fourth preferred embodiment of the present invention, which controls the output voltage of second direct-current power supply 502 to set the average machining gap voltage to 0 V, will now be described with reference to the drawings. In FIG. 11, which is a discharge circuit of an electrical discharge machine illustrating the fourth embodiment, voltage dividing resistors 1101 and 1102, and capacitor 1103 are provided. One end of voltage dividing resistor 1101 is connected to electrode 1 and the other end thereof is connected to one end of voltage dividing resistor 1102. The other end of the voltage dividing resistor 1102 is connected to workpiece 2 and capacitor 1103 is connected in parallel with voltage dividing resistor 1102. Differential amplifier 1105, has one input terminal 1105a connected to the connection point between dividing resistors 1101 and 1102 and its other input terminal 1105b connected to workpiece 2. The average machining gap voltage is detected by voltage dividing resistors 1101, 1102, capacitor 1103 and differential amplifier 1105.

Digital variable output voltage power supply 1107 has a variable voltage mechanism (not illustrated) for outputting a predetermined voltage according to a digital input signal. Interface circuit 1106, having input terminal 1106a connected to output terminal 1105c of differential amplifier 1105 outputs a predetermined digital signal to output terminal 1106b in accordance with the average machining gap voltage output to output terminal 1105c so that the average machining gap voltage is set to 0 V. Output terminal 1106b of interface circuit 1106 is input to a control terminal (not illustrated) of digital variable output voltage power supply 1107.

FIG. 11 is similar to FIG. 5, with the exception that second direct-current power supply 502 is provided with a variable output voltage mechanism for use as digital variable output voltage power supply 1107 and further the circuit is provided with interface circuit 1106, voltage dividing resistors 1101 and 1102, capacitor 1103 and differential amplifier 1105. The variable output voltage mechanism (not illustrated) of digital variable output voltage power supply 1107, voltage dividing resistors 1101, 1102, capacitor 1103, differential amplifier 1105 and interface circuit 1106 comprise voltage setting means 1100.

FIG. 12 is a detailed diagram of interface circuit 1106. Voltage comparator 1201, clock pulse generator 1202, n-bit up/down counter 1203, inverter circuit 1204 for inverting and outputting an input digital signal, and two-input AND circuits 1205 and 1206, respectively, are provided. Positive input terminal 1201a of voltage comparator 1201 is connected to input terminal 1106a of interface circuit 1106. Negative input terminal 1201b of voltage comparator 1201 is grounded, and output terminal 1201c of voltage comparator 1201 is connected to one input terminal 1205a of two-input AND circuit 1205 and input terminal 1204a of inverter circuit 1204. Output terminal 1202a of clock pulse generator 1202 is connected to the other input terminal 1205b of two-input AND circuit 1205 and one input terminal 1206a of two-input AND circuit 1206. In addition, output terminal 1204b of inverter circuit 1204 is connected to the other input terminal 1206b of two-input AND circuit 1206. Further, output terminal 1205c of two-input AND circuit 1205 is connected to count-up input terminal 1203a of up/down counter 1203 and output terminal 1206c of two-input AND circuit 1206 is connected to count-down input terminal 1203b of up/down counter 1203.

Initial set value storage 1207, for storing a preset value for up/down counter 1203, has an n-bit storage capacity and is provided with output terminals $M_1$ to $M_n$ for outputting stored binary information in parallel. Output terminals $M_1$ to $M_n$ are connected to data input terminals $D_1$ to $D_n$ of the up/down counter 1203, respectively. Machining start pulse generator 1203 is provided for outputting a machining start pulse to output terminal 1208a at the start of machining. Output terminal 1208a of machining start pulse generator 1208 is connected to input terminal LD of up/down counter 1203. When the above described machining start pulse is input to input terminal LD of up/down counter 1203, the value of initial set value storage 1207 is downloaded to up/down counter 1203. Output terminals $Q_1$ to $Q_n$ of up/down counter 1203 are connected to voltage setting input terminals $S_1$ to $S_n$ of digital variable voltage power supply 1107, respectively, so as to set the output voltage of digital variable voltage power supply 1107 in accordance with the value of up/down counter 1203.

The operation of interface circuit 1106 will now be described with reference to FIGS. 11 and 12. First, when the machining start pulse is sent to input terminal LD of up/down counter 1203 by machining start pulse generator 1208 at the start of machining, the value of initial set value storage 1207 is downloaded to up/down counter 1203. Digital variable voltage power supply 1107 then outputs an output voltage in accordance with the value of up/down counter 1203. This output voltage is applied to the gap between electrode 1 and workpiece 2 when semiconductor switch 103 is on.

In the meantime, the voltage across electrode 1 and workpiece 2 is divided by voltage dividing resistors 1101, 1102 and integrated by an integrating circuit comprising capacitor 1103 and voltage dividing resistors 1101 and 1102. The average machining gap voltage is then output at output terminal 1105c of differential amplifier 1105. This average machining gap voltage is input to positive input terminal 1201a of voltage comparator 1201, via input terminal 1106a of the interface circuit 1106, as a feedback signal. Since 0 V has been input to negative input terminal 1201b of voltage comparator circuit 1201 as a target average machining gap voltage value, output terminal 1201c of voltage comparator 1201 outputs "1" if the average machining gap voltage is positive, and "0" if the average machining gap voltage is negative. Clock pulse generator 1202 continuously generates a pulse of a predetermined cycle having a waveform similar to the one at output terminal 1202a thereof, to output terminal 1205c of two-input input AND circuit 1205 when output terminal 1201c of voltage comparator 1201 is at "1", i.e. the average machining gap voltage is positive. This causes the up/down counter 1203 to count up. When the output terminal 1201c of voltage comparator 1201 is at "0", i.e. the average machining gap voltage is negative, and output terminal 1205c of two-input AND circuit 1205 is set to "0", output terminal 1204b of inverter circuit 1204 is set to "1", and a pulse of a similar waveform to the one at the output terminal 1202a is output to output terminal 1206c of the two-input AND circuit 1206. This causes up/down counter 1203 to count down. Therefore, the operation automatically sets up/down counter 1203 to a value which causes the average machining gap voltage to be 0 V. Digital variable voltage power supply 1107 outputs a voltage in accordance with the value of up/- down counter 1203. By outputting this voltage to the machining gap as a negative voltage while semiconductor switch 103 is on, the average machining gap voltage is set to 0 V.

FIG. 13 is an operation timing chart illustrating the operation of up/down counter 1203 according to the variations of the average machining gap voltage. FIG. 13a shows a machining signal which is "0" before the start of machining and changes to "1" after the start of machining, FIG. 13b shows the waveform of output terminal 1202a of the clock pulse generator 1202. FIG. 13c shows the waveform of output terminal 1105c of differential amplifier 1105, indicating the average machining gap voltage. FIG. 13d shows the waveform of output terminal 1201c of voltage comparator 1201. FIG. 13e shows the waveform of count-up input terminal 1203a of the up/down counter 1203, and FIG. 13f that of count-down input terminal 1203b thereof FIG. 13g is a waveform indicating the value of up/down counter 1203.

As shown in FIG. 13, clock pulse generator 1202 outputs a pulse of a predetermined cycle. When the average machining gap voltage is positive, output terminal 1201c of voltage comparator 1201 is set to "1", and when negative, is set to "0". When output terminal 1201c of voltage comparator 1201 is "1", the pulse from output terminal 1202a of clock pulse generator 1202 is applied to count-up input terminal 1203a of up/down counter 1203. When output terminal 1201c signal is set to "0", the pulse from output terminal 1202a of clock pulse generator 1202 is applied to count-down input terminal 1203b. Hence, up/down counter 1203 counts up when the average machining gap voltage is positive and counts down when that voltage is negative.

FIG. 14 illustrates signal waveforms of the major areas in FIG. 11. In FIG. 2 which shows the first preferred embodiment, the voltage in FIG. 2a has a waveform approaching 0 V between points $T_2$ and $T_3$. In FIG. 14, however, that voltage has a waveform approaching a predetermined negative voltage Vc. The other waveforms in FIG. 14 are similar to those in FIG. 2.

FIG. 15 illustrates the signal waveforms of the major areas in FIG. 11 where the discharge is not stopped. In FIG. 15a, showing the machining gap voltage Eg, the waveform does not rise between points $T_1$ and $T_2$, but maintains the same voltage as before point $T_1$, and approaches the predetermined negative voltage after point $T_2$. FIG. 15h illustrates the discharge current ig and is similar to that of FIG. 14 with the exception that its waveform does not approach zero at point $T_1$ but increases in current value to point $T_2$.

With the average machining gap voltage controlled to be 0 V, the fourth embodiment allows the effect of the third embodiment to be more complete.

Figure 16:
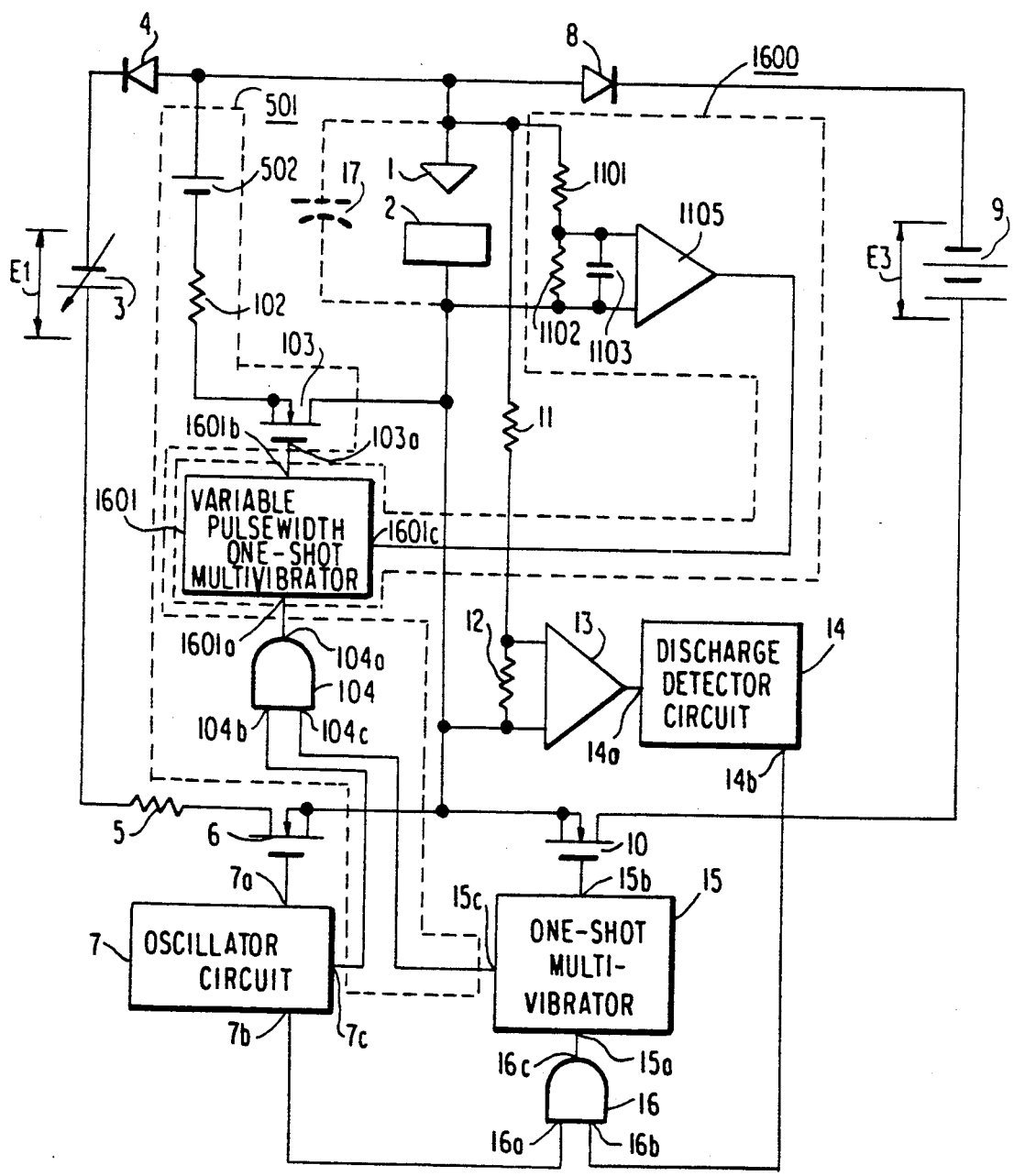
FIG. 16 is a discharge circuit diagram of an electrical discharge machine illustrating the first embodiment of the present invention.

A fifth preferred embodiment of the present invention, which includes a circuit that controls the ON time during duration of semiconductor switch 103 to set the average machining gap voltage to 0 V, will now be described with reference to the drawings. FIG. 16 is a discharge circuit diagram of an electrical discharge machine, and FIG. 16 is similar to FIG. 5 with the exception that variable pulse width one-shot multivibrator 1601 is provided between output terminal 104a of two-input AND circuit 104 and control terminal 103a of semiconductor switch 103. In addition, the circuit is provided with voltage dividing resistors 1101 and 1102, capacitor 1103 and differential amplifier 1105 as in FIG. 11. Output terminal 1105c of differential amplifier 1105 is connected to pulse width control terminal 1601c of variable pulse width one-shot multivibrator 1601. That is, output terminal 104a of two-input AND circuit 104 is connected to trigger terminal 1601a of variable pulse width one-shot multivibrator 1601 and output terminal 1601b of variable pulse width one-shot multivibrator 1601 is connected to control terminal 103a of semiconductor switch 103. Voltage dividing resistors 1101 and 1102, capacitor 1103, differential amplifier 1105 and variable pulse width one-shot multivibrator 1601 comprise voltage application time setting means 1600.

Figure 17:
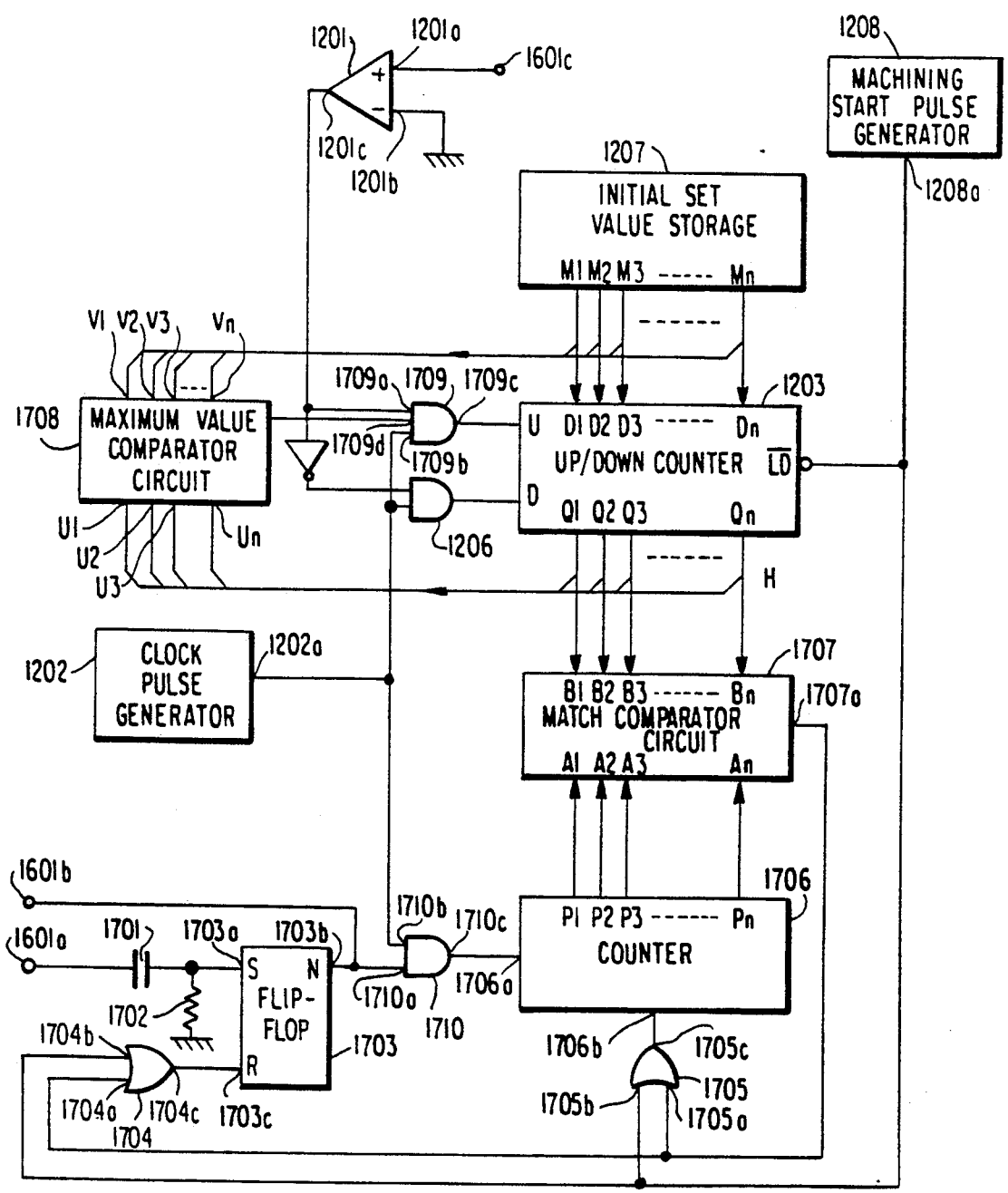
FIG. 17 is a detailed diagram of an interface circuit shown in FIG. 16.

FIG. 17 is a detailed circuit diagram of variable pulse width one-shot multivibrator 1601. FIG. 17 is similar to FIG. 12 illustrating the interface circuit 1106 of the fourth embodiment, with the exception that it is provided with capacitor 1701, resistor 1702, flip-flop 1703, two-input OR circuits 1704 and 1705, two-input AND circuit 1710, counter 1706, match comparator circuit 1707 and maximum value comparator 1708. In addition, an input terminal for entering an output signal from maximum value comparator circuit 1708 is added to (former) two-input AND circuit 1205, i.e., the same is replaced with three-input AND circuit 1709.

Trigger input terminal 1601a of variable pulse width one-shot multivibrator 1601 is connected to one end of capacitor 1701. The other end of capacitor 1701 is connected to S-input terminal 1703a of flip-flop 1703 and one end of resistor 1702. The other end of the resistor 1702 is grounded. N-output terminal 1703b of flip-flop 1703 is connected to one input terminal 1710a of two-input AND circuit 1710 and output terminal 1601b of variable pulse width one-shot multivibrator 1601.

The other input terminal 1710b of two-input AND circuit 1710 is connected to output terminal 1202a of clock pulse generator 1202. Output terminal 1710c of two-input AND circuit 1710 is connected to count input terminal 1706a of counter 1706. Output terminals $P_1$ to $P_n$ of counter 1706 are connected to comparison input terminals $A_1$ to $A_n$ on one side of match comparator circuit 1707, respectively, and comparison input terminals $B_1$ to $B_n$ on the other side thereof are connected to output terminals $Q_1$ to $Q_n$ of up/down counter 1203, respectively. Match output terminal 1707a of match comparator circuit 1707 is connected to one input terminal 1704a of two-input OR circuit 1704 and one input terminal 1705a of two-input OR circuit 1705. In addition, the other input terminal 1704b of two-input OR circuit 1704 and the other input terminal 1705b of two-input OR circuit 1705 are connected to output terminal 1208a of machining start pulse generator 1208. Further, output terminal 1704c of two-input OR circuit 1704 is connected to R-input terminal 1703c of flip-flop 1703 and output terminal 1705c of two-input OR circuit 1705 is connected to reset input terminal 1706b of counter 1706.

Comparison input terminals $U_1$ to $U_n$ on one side of maximum value comparator circuit 1708 are connected to output terminals $Q_1$ to $Q_n$ of the up/down counter 1203, respectively. The other comparison input terminals $V_1$ to $V_n$ are connected to the output terminals $M_1$ to $M_n$ of initial set value storage 1207, respectively. Output terminal 1708a of maximum value comparator circuit 1708 is set to "1" when data of comparison input terminals $U_1$ to $U_n$ is smaller than that of the comparison input terminals $V_1$ to $V_n$ and outputs "0" when the former is larger than the latter. input terminals 1709a and 1709b of three input AND circuit 1709 are connected to output 1201c of comparator 1201 and output 1202a of clock pulse generator 1202, respectively. Output 1709c is connected to the up counting terminal of up/down counter 1203.

The operation of variable pulse one-shot multivibrator 1601 illustrated in FIG. 17 will now be described. First, when the machining start pulse is provided to input terminal LD of up/down counter 1203 by machining start pulse generator 1208 at the start of machining, the value of initial set value storage 1207 is downloaded to up/down counter 1203. Since the maximum count value of the up/down counter 1203 is designed to be set to initial set value storage 1207 beforehand, up/down counter 1203 is set to the maximum count value at the start of machining. At this time, counter 1706 and flip-flop 1703 are simultaneously reset via two-input OR circuits 1705 and 1704.

Meanwhile, when semiconductor switches 6 and 10 are both turned off, i.e. when output terminal 7c of oscillator circuit 7 and output terminal 15c of one-shot multivibrator 15 are both "1," output terminal 104a of the two-input AND circuit 104 is also set to 1. Output terminal 104a is connected to trigger input terminal 1601a of variable pulse width one-shot multivibrator 1601. In addition, a differentiating circuit comprising capacitor 1701 and resistor 1702 forces a pulse to be entered into S-input terminal 1703a of flip-flop 1703 and also causes flip-flop 1703 to be set on the leading edge of the signal from output terminal 104a of two-input AND circuit 104, in other words, when that signal changes from "0" to "1." When flip-flop 1703 is set, N-output terminal 1703b is set to "1" and a pulse similar to the one from output terminal 1202a of clock pulse generator 1202 is applied to counter input terminal 1706a of counter 1706 via two-input AND circuit 1710. This pulse causes counter 1706, having been reset beforehand, to start counting. When the value of up/down counter 1203 matches that of counter 1706, output terminal 1707a of the match comparator circuit 1707 is set to 1. Flip-flop 1703 is then reset via two-input OR circuit 1704, and counter 1706 is reset via two-input OR circuit 1705. Accordingly, a pulse which rises on the leading edge of a signal input to input terminal 1601a and falls after a period of time based on the value set to up/down counter 1203, is output to output terminal 1601b of variable pulse width one-shot multivibrator 1601 which is connected to N-output terminal 1703b of the flip-flop 1703.

Since output terminal 1105c of differential amplifier 1105 is connected to pulse width control terminal 1601c, output terminal 1201c of voltage comparator 1201 is set to "0". The average machining gap voltage is negative. When to the pulse from the output terminal of clock pulse generator 1202 is applied to count-down input terminal 1203b of up/down counter 1203, via two-input AND circuit 1210, so as to cause up/down counter 1203 to count down.

When up/down counter 1203 has counted down, the width of the pulse output to output terminal 1601b of variable pulse width one-shot multivibrator 1601 decreases, and the application time of negative voltage to the machining gap is reduced via semiconductor switch 103 to raise the average machining gap voltage.

When a positive voltage is achieved by virtue of the rise of the average machining gap voltage, and if output terminal 1708a of the maximum value comparator circuit 1708 is set to "1,", the pulse of clock pulse generator 1202 is applied to count-up input terminal 1203a of up-down counter 1203 so as to cause up/down counter 1203 to count up, thereby reducing the average machining gap voltage. Hence, if output terminal 1708a of maximum value comparator circuit 1708 is set to "1,", up/down counter 1203 is set to a value which forces the average machining gap voltage to 0 V. When the value of up/down counter 1203 has become equal to that of initial set value storage 1207, up/down counter 1203 does not count up and its value does not increase further, even if the average machining gap voltage is positive.

The value of up/down counter 1203 is limited to less than the value set to initial set value storage 1207 so that the width of the pulse from output terminal 1601b of variable pulse width one-shot multivibrator 1601 does not exceed the discharge dwell time, the length of time when semiconductor switches 6 and 10 are both off.

FIG. 18 is a timing chart illustrating how up/down counter 1203 operates according to the variations of the average machining gap voltage. FIG. 18 is similar to FIG. 13, with the exception that waveform dd of output terminal 1708a of maximum value comparator circuit 1708 has been added and that waveform e of count-up input terminal 1203a of up/down counter 1203 is "0" when waveform dd is "0." Therefore, waveform g of up/down counter 1203 indicates that it has stopped counting up. FIGS. 18a to d and f show waveforms similar to those in FIG. 13a to d and f, respectively.

FIG. 19 is an operation timing chart where a discharge stop does not take place. FIGS. 19b to h are similar to those in FIG. 15b to h, respectively. FIG. 19i shows the waveform of output terminal 1601b of variable pulse width one-shot multivibrator 1601. FIG. 19a, illustrating the machining gap voltage, has a waveform where a predetermined negative voltage is applied when output terminal 1601b signal is set to "1."

The fifth preferred embodiment, similar to the fourth preferred embodiment, controls the average machining gap voltage to be 0 V so as to prevent electrolysis and corrosion of workpiece 2 as well as magnetization thereof.

Figure 20:
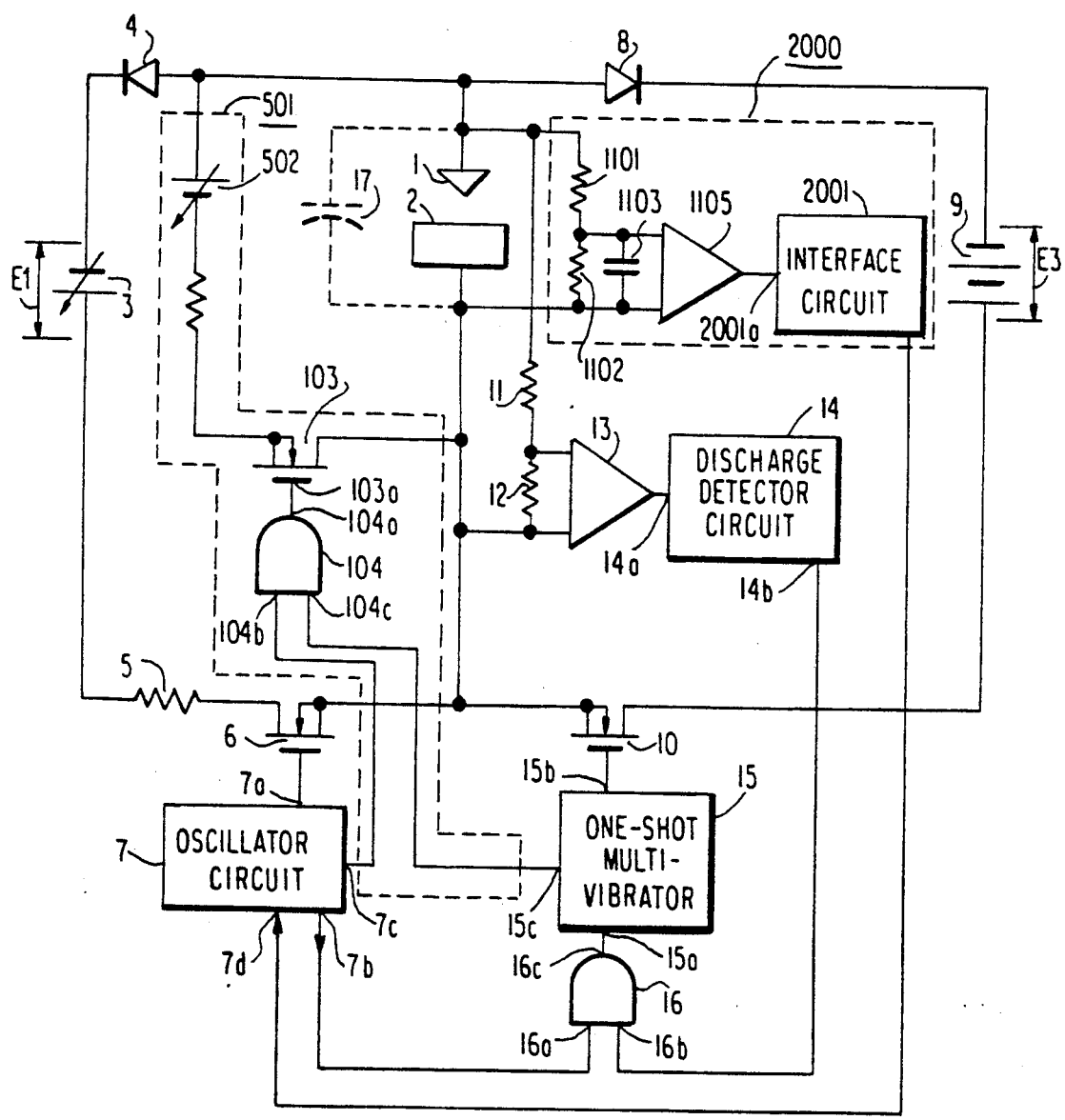
FIG. 20 is a discharge circuit diagram of an electrical discharge machine illustrating a sixth embodiment of the present invention.
Figure 23A:
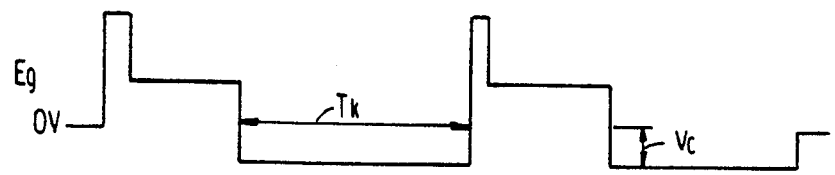
FIGS. 23a, 23b, 23c, 23d, 23e, 23f, 23g, and 23h are operation timing chart of the discharge circuit shown in FIG. 20.
Figure 23B:
Figure 23C:
Figure 23D:
Figure 23E:
Figure 23F:
Figure 23G:
Figure 23H:

A sixth preferred embodiment of the present invention, which controls the discharge dwell time so as to set the average machining gap voltage to 0 V, will now be described with reference to the drawings. FIG. 20 is a discharge circuit diagram for an electrical discharge machine illustrating the sixth embodiment, and is similar to FIG. 5, with the exception that it is provided with discharge dwell time setting means 2000 comprising the voltage dividing resistors 1101 and 1102, capacitor 1103, differential amplifier 1105 and interface circuit 2001. The output terminal of differential amplifier 1105 is connected to input terminal 2001a of interface circuit 2001 and output terminals of interface circuit 2001 are connected to the setting input terminals of off-time setter 4011 in oscillator circuit 7. The setting input terminals of off-time setter 4011 and output terminals of interface circuit 2001 are respectively identical in number to output terminals of off-time setter 4011 in oscillator circuit 7, and corresponding digits thereof are connected to each other.

FIG. 21 is a diagram of interface circuit 2001 which is identical to interface circuit 1106 in the fourth embodiment, with the exception that output terminals $Q_1$ to $Q_n$ of up/down counter 1203 are connected to different terminals from those in FIG. 12. In particular, while output terminals $Q_1$ to $Q_n$ of up/down counter 1203 are connected to digital variable output voltage power supply 1107 in FIG. 12, they are connected to the setting input terminals of off-time setter 4011 in oscillator circuit 7 in FIG. 21.

Operation of the interface circuit of the sixth embodiment will now be described. A negative voltage is applied to the machining gap during the discharge dwell time. However, interface circuit 2001 is provided to control the average machining gap voltage to 0 V as mentioned above. The operation of interface circuit 2001 is similar to the one in FIG. 12, with the exception that discharge dwell time is controlled instead the magnitude of the negative voltage applied to the machining gap as in FIG. 12.

FIG. 22 is the operation timing chart of the interface circuit 2001 and is similar to FIG. 13 illustrating the timing of the fourth embodiment. FIG. 23 is the operation timing chart of the sixth embodiment, where a discharge stop does not occur. In addition, FIG. 23 is identical to FIG. 15, i.e. the operation timing chart of the fourth embodiment, with the exception of discharge dwell time Tk. Further, this embodiment has the same effect as the fourth embodiment. The average machining gap voltage is maintained at zero by controlling the discharge dwell time.

Figure 24:
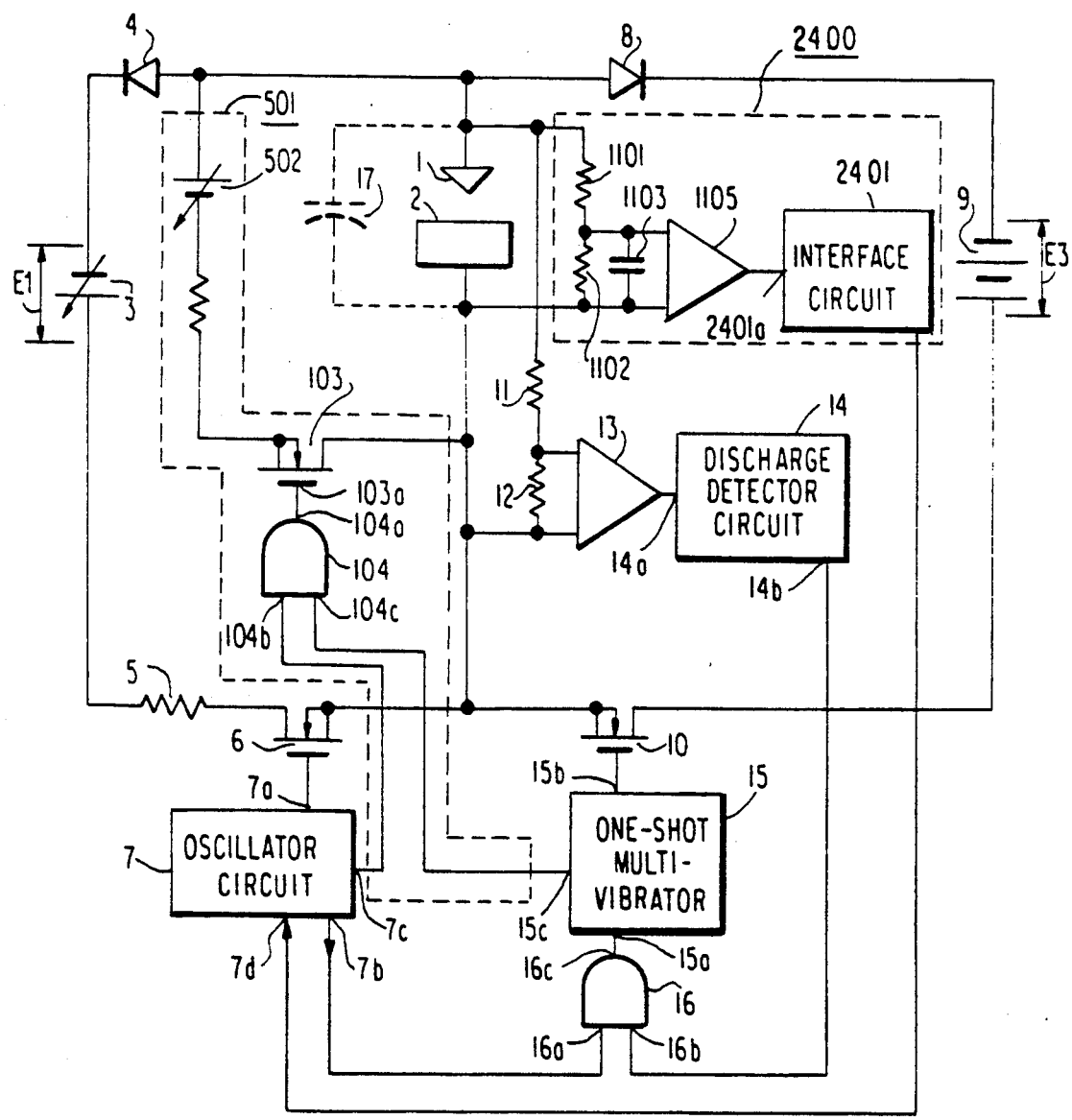
FIG. 24 a discharge circuit diagram of an electrical discharge machine illustrating a seventh embodiment of the present invention.

A seventh preferred embodiment of the present invention, which controls the time of applying a positive voltage to the machining gap to set the average machining gap voltage to 0 V, will now be described with reference to the drawings. FIG. 24 is the discharge circuit diagram of an electrical discharge machine illustrating the seventh embodiment. FIG. 24 is similar to FIG. 20, showing the sixth embodiment, with the exception that the output terminals of interface circuit 2001 are connected to different terminals from those in FIG. 20 and interface circuit 2001 is replaced by interface circuit 2401. That is, while the output terminals of interface circuit 2001 are connected to the setting input terminals of off-time setter 4011 in oscillator circuit 7 in FIG. 20, they are connected to the setting input terminals of on-time setter 4010 in the oscillator circuit 7 in FIG. 24. In addition, discharge voltage application time setting means 2400 comprises voltage dividing resistors 1101 and 1102, capacitor 1103, differential amplifier 1105 and interface circuit 2401.

Figure 25:
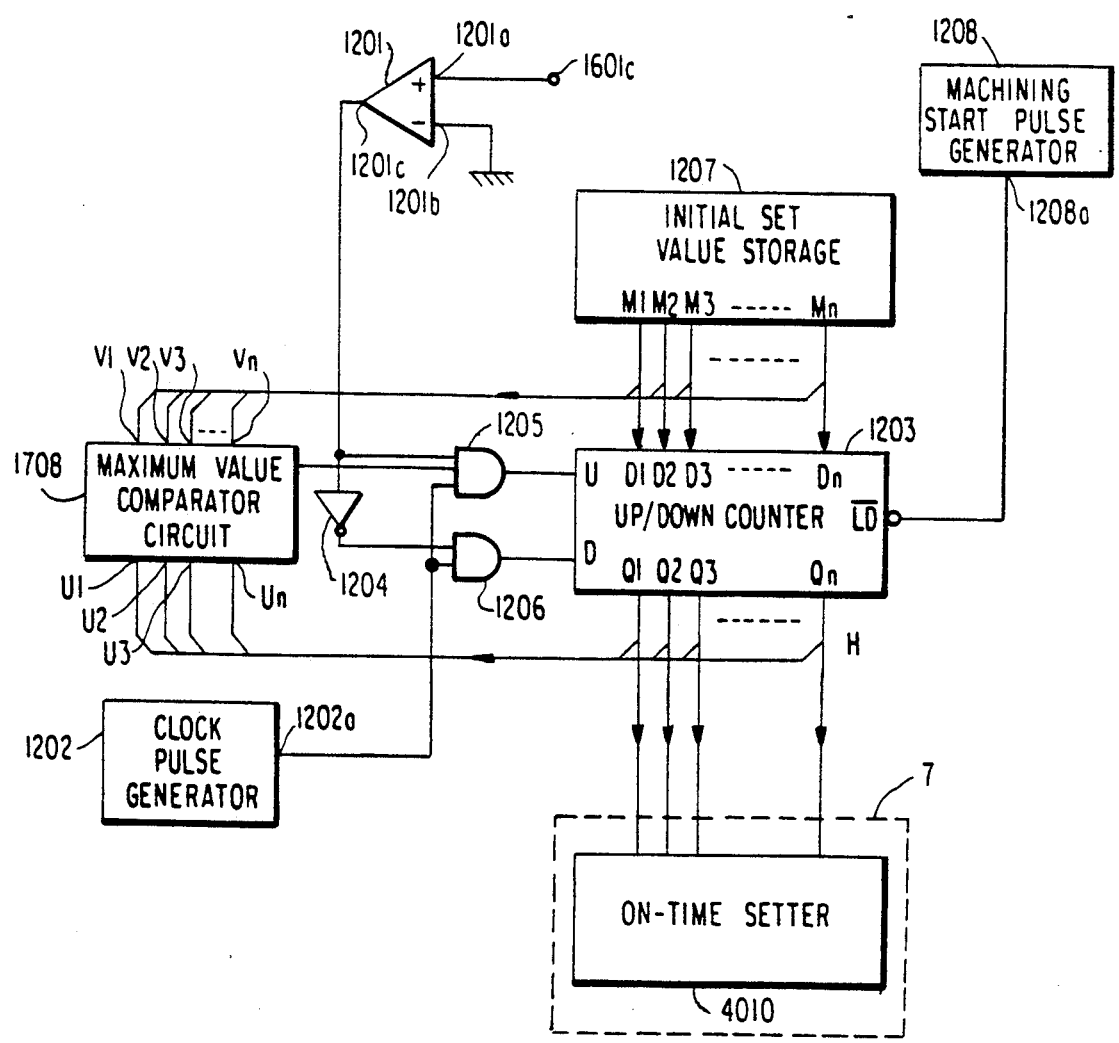
FIG. 25 is a detailed diagram of an interface circuit shown in FIG. 24.

FIG. 25 is a detailed circuit diagram of interface circuit 2401 and is identical to FIG. 17 illustrating interface circuit 1601 of the fifth embodiment, with the exception that output terminals $Q_1$ to $Q_n$ of up/down counter 1203 are connected to setting input terminals of on-time setter 4010 in oscillator circuit 7. Capacitor 1701, resistor 1702, flip-flop 1703, two-input OR circuits 1704, 1705, counter 1706, match comparator circuit 1707 and maximum value comparator circuit 1708 have been excluded Three-input AND circuit 1709 is replaced by the two-input AND circuit 1205.

FIG. 26 is the operation timing chart of interface circuit 2401 and is identical to FIG. 18 illustrating the fifth embodiment, with the exception of the polarity of machining gap voltage Eg. The polarity of machining gap voltage Eg, shown in FIG. 26c, is different from that in FIG. 18 for the following reason: if the average machining gap voltage is, for example, positive, the up/down counter 1203 must be forced to count up and the time of applying a negative voltage to the machining gap increased to reduce the average machining gap voltage in the fifth embodiment. However, up/down counter 1203 must be forced to count down and the time of applying a positive voltage to the machining gap decreased to reduce the average machining gap voltage in the present embodiment if the average machining gap voltage is positive. Interface circuit 2401 is provided with maximum value comparator circuit 1708 because a normal discharge cannot be carried out if the time of applying the positive voltage to the machining gap is increased without restriction. The operation of interface circuit 2401 is not described in detail because it is identical to that of the interface circuit 2001 in the sixth embodiment, with the exception that the count up is limited by the maximum value comparator circuit 1708, as in the fifth embodiment.

Figure 7A:
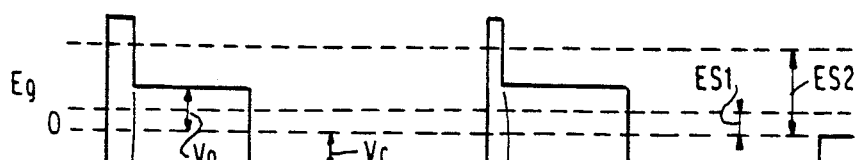
Figure 7B:
Figure 7C:
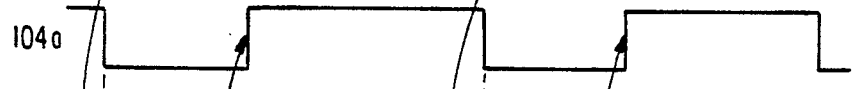
Figure 7D:
Figure 7E:
Figure 7F:
Figure 7G:
Figure 7H:

FIG. 27 is the operation timing chart of the discharge circuit shown in FIG. 24. When FIG. 27 is compared with FIG. 7, illustrating the third embodiment, FIG. 27b and FIG. 7b are different where they indicate the control terminal state of the semiconductor switch 6. In particular, while the length of time when the signal in FIG. 7b is "1," i.e. the period of time when semiconductor switch 6 is on, is constant in FIG. 7, it is variable in FIG. 27b.

FIG. 27 illustrates a case where one-shot multivibrator 15 is not triggered between points T2701 and T2702 and a voltage is generated by first direct-current power supply 3 after the pulse is output to output terminal 7b of oscillator circuit 7. FIG. 27 is similar to FIG. 7, with the exception of the above-mentioned differences.

FIG. 28 is the operation timing chart of the discharge circuit shown in FIG. 24 where a discharge is not generated. The signal in FIG. 28c illustrating the voltage waveform at control terminal 103a of semiconductor switch 103 is inverse to the one in FIG. 28b illustrating the control terminal state of semiconductor switch 6. The machining gap voltage is the voltage of first direct-current power supply 3 when the signal in FIG. 28b is "1," and is a negative voltage provided by second direct-current power supply 502 when that signal is "0." FIG. 28d shows the waveform at output terminal 7b of oscillator circuit 7 and is identical to that of FIG. 7.

The signal in FIG. 28e illustrating the voltage waveform at output terminal 14b of discharge detector circuit 14, the one in FIG. 28f showing the voltage waveform at input terminal 15a of the one-shot multivibrator 15, the one in FIG. 28g illustrating the voltage waveform at the control terminal of semiconductor switch 10 and the one in FIG. 28h showing the discharge current waveform all remain 0 V. Accordingly FIG. 28 also illustrates how the average machining gap voltage is controlled to remain at 0 V when no discharge occurs. Thus, this embodiment has the same advantages as the fourth embodiment.

Whereas the period of time when the signal in FIG. 27b is "1" is variable and the length of time Td from the rise of the waveform in FIG. 27b to the rise of the waveform in FIG. 27d is constant in the seventh embodiment, the same effect may be accomplished by making the time Td variable and holding the time from the rise of the waveform in FIG. 27d to the fall of the waveform in FIG. 27b constant.

In the fourth through seventh embodiments, any of the second direct-current power supply 502 output voltage, the application time of the inverse voltage to the machining gap, the discharge dwell time, or the application time of the positive voltage to the machining gap may be made variable. That is, for example, when any of the above-mentioned embodiments is put into practice, there is a limitation on the variable range of the parameter varied for controlling the average machining gap voltage to 0 V, and the average machining gap voltage may not be set to 0 V. In such a case, any of the other aforementioned fixed parameters may also be changed automatically to control the average machining gap voltage to 0 V. Further, in embodiments 3 to 7, the resistor 102 may be increased in resistance and the output voltage of the second direct-current power supply 502 made high enough to allow a discharge.

FIG. 29 illustrates the machining gap voltage and discharge current of an eighth embodiment where the resistance value of resistor 102 is variable and set to be smaller when the output voltage of the second direct-current a power supply 502 is high.

FIGS. 29a and b show the machining gap voltage and discharge current, respectively, where the resistance value of resistor 102 is small and FIGS. 29c and d show the machining gap voltage and discharge current, respectively, where the resistance value of resistor 102 is large. FIG. 29a shows a waveform which is a high negative voltage during no-load time between points T2901 and T2902 and is a low negative voltage E2901 when a discharge then begins. FIG. 29b illustrates a waveform wherein a large negative current i2901 flows instantaneously between points T2902 and T2903 because electrical charges accumulated in the inherent stray capacitance of the machining gap are discharged, and a continuous arc current i2902 then flows. FIG. 29c illustrates a waveform which is a high negative voltage during no-load time between points T2904 and T2905 and approaches a low negative voltage E2901 when a discharge takes place instantaneously at points T2905 and T2906 but immediately returns to the high negative voltage. At point T2907, this waveform returns to 0 V as soon as semiconductor switch 103 is turned off. FIG. 29d shows a waveform where a large negative current flows instantaneously at the points T2905 and T2906 because electrical charges accumulated in the stray capacitance of the machining gap are discharged.

In particular, as shown in FIGS. 29a and b, a discharge in the negative direction is liable to be a continuous arc discharge when resistor 1020 is set to a value similar to that of the current limiting resistor 5 and the output voltage of the second direct-current power supply 502 is set to approximately output voltage $E_1$ of the first direct-current power supply 3. On the other hand, when the resistance value of resistor 102 is increased to about 20–100 ohms, as shown in FIGS. 29c and d, the discharge current become discontinuous as there is only a discharge current developed by the electric charges accumulated in the stray capacitance of the machining gap.

Accordingly, if a high negative voltage is applied to the machining gap, a low discharge current rarely flows and the average machining gap voltage can be controlled, by varying a resistance value of resistor 102, avoiding damage to workpiece 2.

Figure 30:
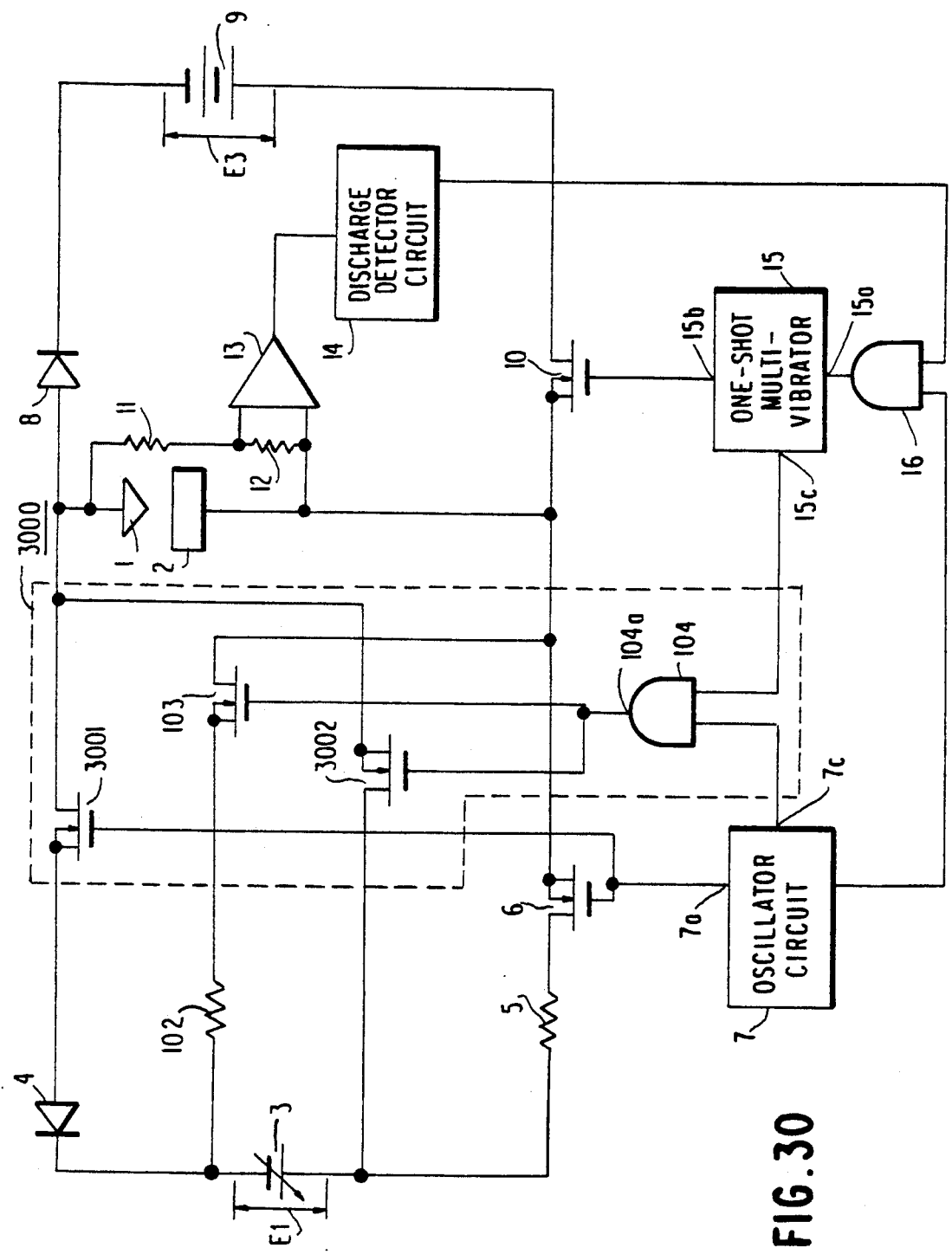
FIG. 30 is a discharge circuit diagram of an electrical discharge machine illustrating a still further embodiment of the present invention.

A ninth embodiment of the present invention will now be described with reference to the drawings. FIG. 30 is a discharge circuit diagram of an electrical discharge machine, of the ninth embodiment, which supplies the machining gap with the output of first direct-current power supply 3 switched into a positive or a negative voltage, thereby eliminating the need for second direct-current power supply 502 utilized in other embodiments.

Namely, FIG. 30 is similar to FIG. 5 with the exception that the circuit is provided with first semiconductor 3001 switch turned on/off simultaneously with semiconductor switch 6 for connecting or disconnecting the positive output of first direct-current power supply 3 to or from the machining gap, and second semiconductor switch 3002 turned on/off simultaneously with semiconductor switch 103 for connecting or disconnecting the negative output of the first direct-current power supply 3 to or from the machining gap. Thus, second direct-current power supply 502 is eliminated by switching connections so that the positive output Of first direct-current power supply 3 is applied to the machining gap when the output terminal 7a of oscillator circuit 7 is set to "1" and the negative output of first direct-current power supply 3 is applied to the machining gap when output terminal 104a of two-input AND circuit 104 is set to "1."

First semiconductor switch 3001 is inserted between the positive pole of diode 4 and electrode 1. The positive pole of first semiconductor switch 3001 is connected to electrode 1, and the negative pole thereof is connected to the positive pole of diode 4. The control terminal of first semiconductor switch 3001 is connected to output terminal 7a of oscillator circuit 7.

In addition, whereas one end of resistor 102 is connected to the negative pole of second direct-current power supply 502 in FIG. 5, it is connected to the negative pole of first direct-current power supply 3, in FIG. 30. Further, the positive pole of second semiconductor switch 3002 is connected to the positive pole of first direct-current power supply 3 and the negative pole of second semiconductor switch 3002 is connected to electrode 1. The control terminal of second semiconductor switch 3002 is connected to output terminal 104a of two-input AND circuit 104. In other respects, FIG. 30 is similar to FIG. 5. First semiconductor switch 3001, second semiconductor switch 3002, semiconductor switch 103, and two-input AND circuit 104 comprise a select switch circuit 3000.

Figure 31A:
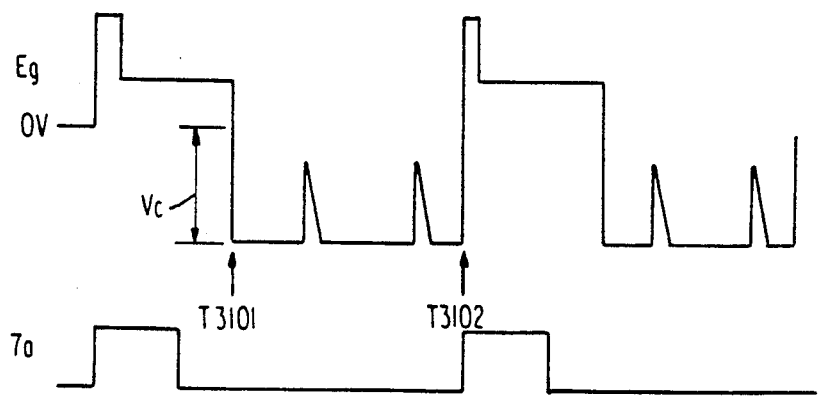
FIGS. 31a, 31b, 31c, 31d, 31e, 31f, 31g, and 31h are timing operation timing charts of the discharge circuit shown in FIG. 30.
Figure 31B:
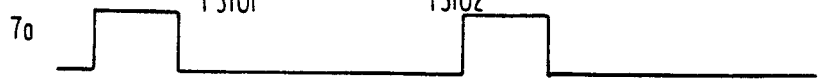
Figure 31C:
Figure 31D:
Figure 31E:
Figure 31F:
Figure 31G:
Figure 31H:
Figure 32:
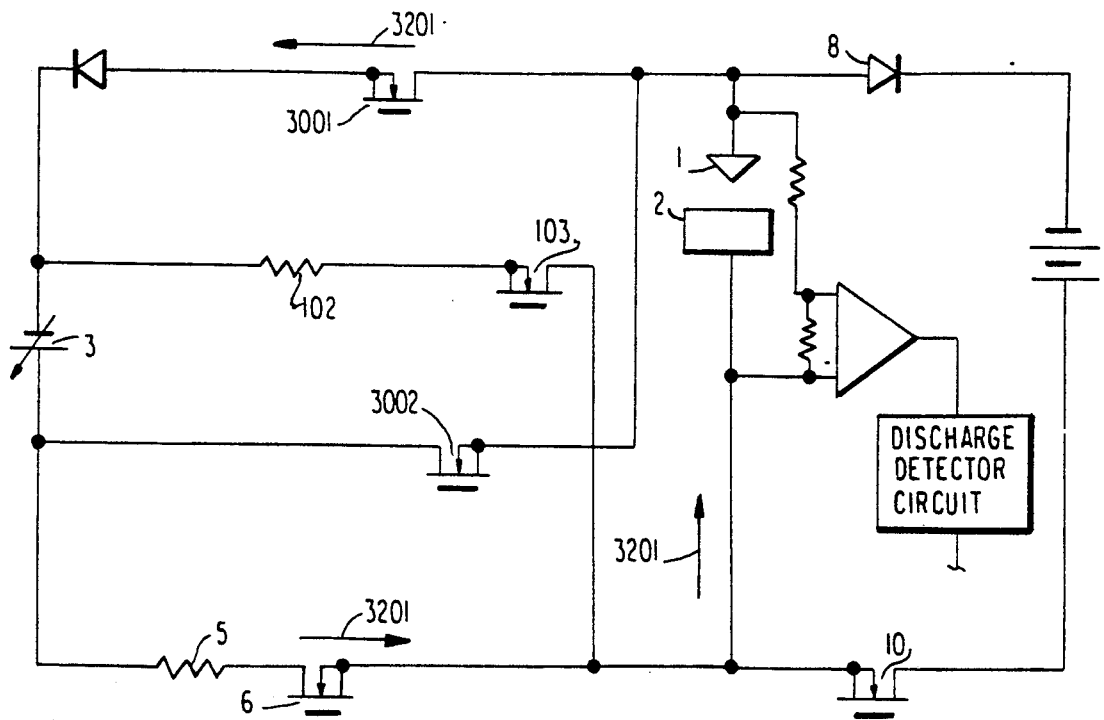
FIGS. 32, 33, and 34 illustrate current paths of the discharge circuit shown in FIG. 30.
Figure 33:
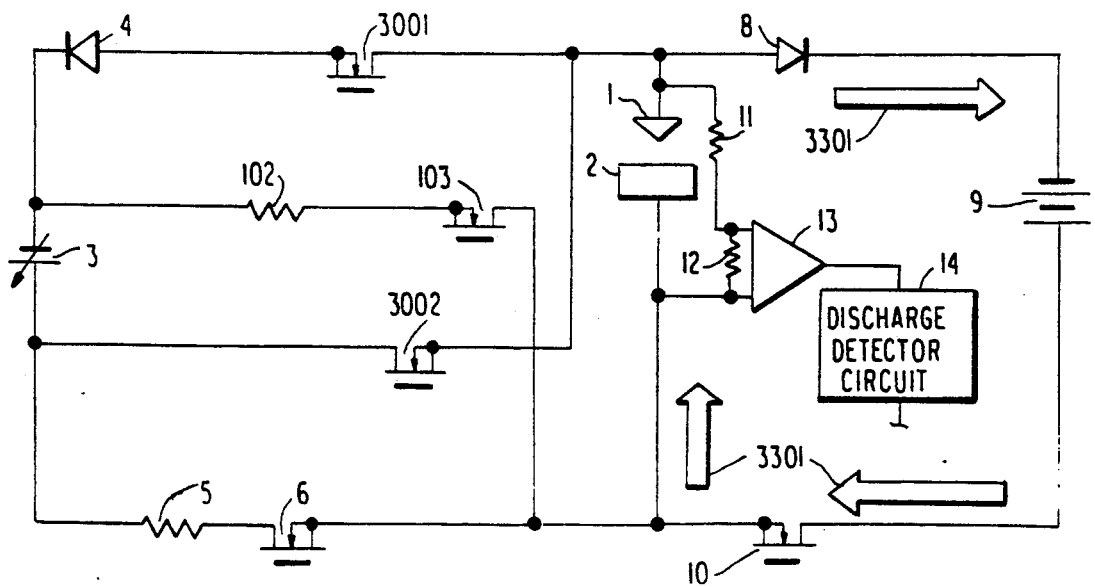
Figure 34:
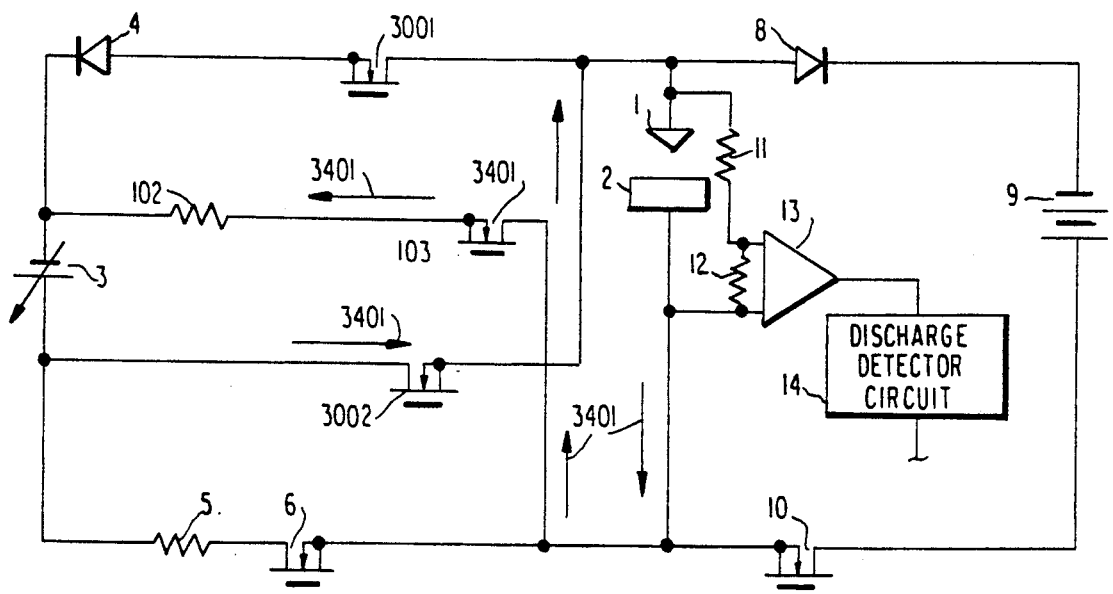

Operation of this embodiment will now be described with reference to an operation timing chart shown in FIG. 31, which is identical to FIG. 7 with the exception of the machining gap voltage Eg during discharge dwell time. In other words, FIG. 31a shows a waveform similar to the one between the points T2904 and T2907 in FIG. 29c during the period from point T3101 to point T3102. FIGS. 32 to 34 illustrate the directions of a current flowing in the discharge circuit when semiconductor switch 6 and first semiconductor switch 3001 are on, when semiconductor switch 10 is on, and the semiconductor switch 103 and second semiconductor switch 3002 are on, respectively. Namely, the machining gap voltage is applied so that the current flows in a direction indicated by arrow 3201 in FIG. 32 until a discharge is started, the current flows in a direction indicated by arrow 3301 in FIG. 33 when the discharge is started, and the current flows in a direction indicated by arrow 3401 in FIG. 34 during the discharge dwell time.

In FIG. 30, one end of resistor 102 connected to the negative pole of first direct-current power supply 3 may be connected to the positive pole of diode 4 instead. Further, resistor 102 inserted between the negative pole of first direct-current power supply 3 and the negative pole of semiconductor switch 103 may be inserted in a path of the current flowing in semiconductor switch 103 instead, e.g. between the positive pole of first direct-current power supply 3 and the positive pole of the second semiconductor switch 3002.

This embodiment allows the discharge circuit to be configured at low cost because it has the advantage of the previous embodiments and does not require the second direct-current power supply. In addition, in a similar manner, the second direct-current power supply 502 may be eliminated from the remaining embodiments discussed above. Further, discharge stop detector circuit 301 may also be provided in the embodiments above so as to apply a negative voltage to the machining gap as soon as the discharge stops.

Figure 35:
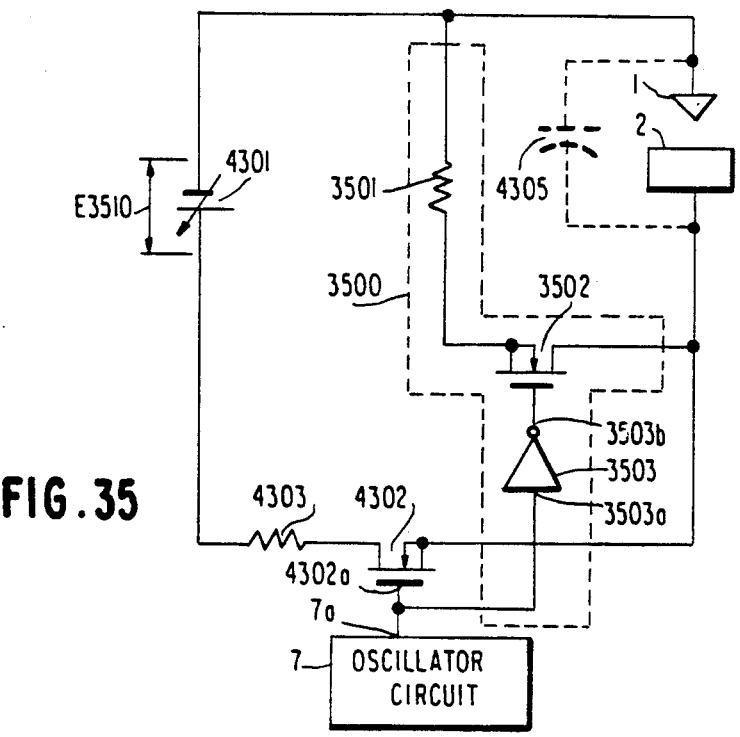
FIG. 35 is a discharge circuit diagram of an electrical discharge machine illustrating another embodiment of the present invention.

FIG. 35 is a discharge circuit diagram of an electrical discharge machine illustrating a tenth preferred embodiment of the present invention. FIG. 35 has bypass circuit 3500 in addition to a conventional discharge circuit, as shown in FIG. 43.

Resistor 3501 and semiconductor switch are connected in a series circuit between electrode 1 and workpiece 2. Output terminal 3503b of inverter circuit 3503 is connected to the control terminal of semiconductor switch 3502, and input terminal 3503a thereof is connected to output terminal 7a of oscillator circuit 7.

Figure 36A:
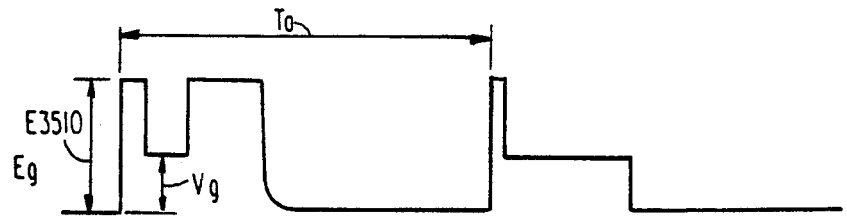
Figure 36B:
Figure 36C:
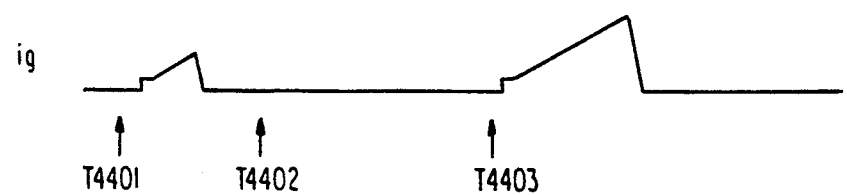

Operation will now be described with reference to an operation timing chart shown in FIG. 36, which is identical to FIG. 45, with the exception of the machining gap voltage Eg during the discharge stop time, i.e. from point T4402 to point T4403. FIG. 36 shows a waveform in which machining gap voltage Eg starts dropping rapidly at the point T4402. This is because semiconductor switch 3502 is on during a period from point T4402 to point T4403, which forces electrical charges, accumulated due to stray capacitance 4305 between electrode 1 and workpiece 2 to be discharged via resistor 3501. The tenth embodiment has the same advantages as the first embodiment but without the need for third direct-current power supply 9.

Figure 37:
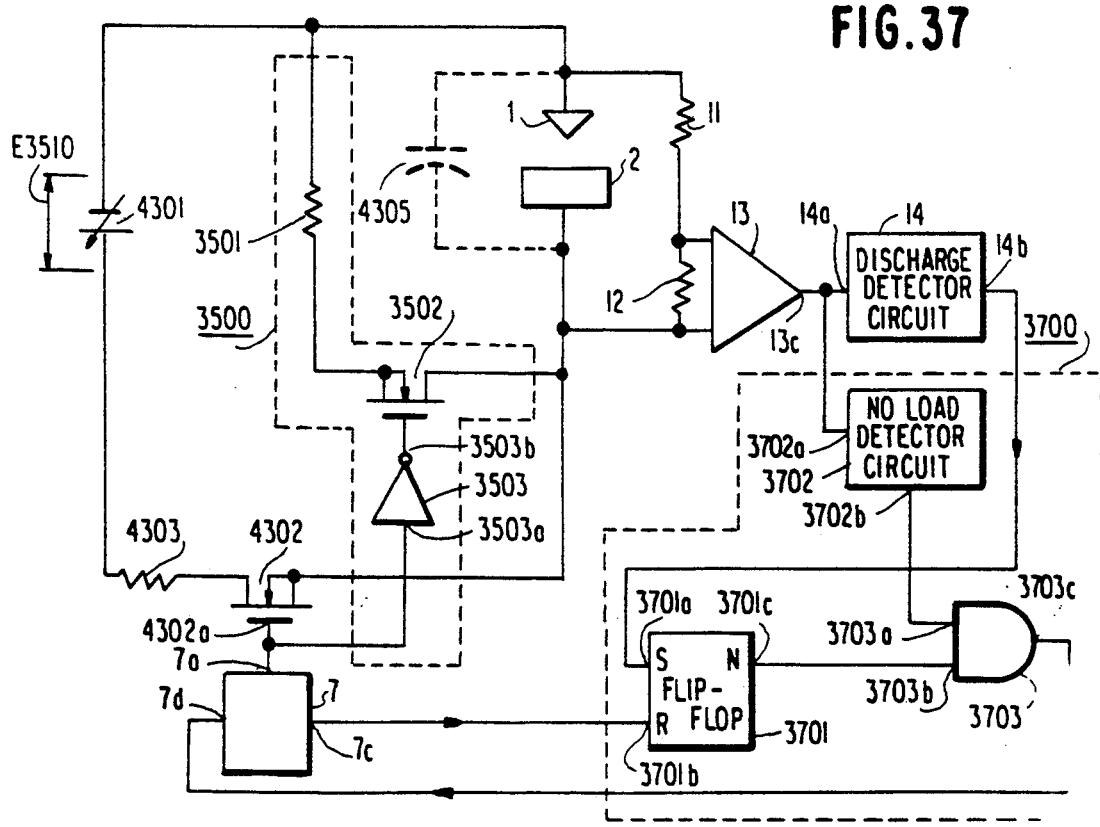
FIG. 37 is a discharge circuit diagram of an electrical discharge machine illustrating a further embodiment of the present invention.

FIG. 37 is a discharge circuit diagram of an electrical discharge machine illustrating the eleventh preferred embodiment of the present invention. The circuit in FIG. 37 is provided with voltage dividing resistors 11 and 12, differential amplifier 13, and discharge detector circuit 14 and a discharge stop detector circuit 3700, in addition to the circuit in FIG. 35. In FIG. 37, the discharge detector circuit section comprising the voltage dividing resistors 11, 12, differential amplifier 13, and discharge detector circuit 14 is identical to the conventional one in FIG. 39.

Discharge stop detector circuit 3700 will now be described in accordance with FIG. 37. S-input terminal 3701a of flip-flop 3701 is connected to output terminal 14b of discharge detector Circuit 14 and R-input terminal 3701b of flip-flop 3701 is connected to output terminal 7c of oscillator circuit 7. The inverse signal of output terminal 7a is output to the output terminal 7c. The output terminal of differential amplifier 13 is connected to input terminal 3702a of load detector circuit 3702 and output terminal 3702b of load detector circuit 3702 is connected to one input terminal 3703a of two-input AND circuit 3703. In addition, the other input terminal 3703b of two-input AND circuit 3703 is connected to N-output terminal 3701c of flip-flop 3701. Further, output terminal 3703c of two-input AND circuit 3703 is connected to the reset terminal 7d of the oscillator circuit 7. The signal from output terminal 7a of oscillator circuit 7 is a pulse rising at a predetermined cycle and having a predetermined pulse width. When a "1" is input to reset terminal 7d with output terminal 7a signal being set to "1,", output terminal 7a then remains at "0" until the next leading edge and the aforementioned pulse width is reduced only in that one cycle.

The operation of discharge stop detector circuit 3700 will now be described in reference to an operation timing chart in FIG. 38, which is similar to FIG. 45 with the exception of the period between points T4501 and T4503. When the discharge is stopped at point T4501, "1" is output to output terminal 3702b of no load detector circuit 3702, which causes one input terminal 3703a of two-input AND circuit 3703 to be set to "1." When the machining gap voltage Eg rises beyond predetermined voltage Es3801 between machining gap voltage Vg at the time of discharge and output voltage E3510 of direct-current power supply 4301, no load detector circuit 3702 outputs "1" to output terminal 3702b, and when that voltage is smaller than Es3801, it outputs a "0".

In the meantime, flip-flop 3701 is set when discharge detector circuit 14 has detected a discharge and output terminal 14b thereof is set to "1" at point T3801, and N-output terminal 3701c signal of flip-flop 3701 is "1." Hence, when output terminal 3702b of no load detector circuit 3702 is set to "1," a "1" is also output to output terminal 3703c of two-input AND circuit 3703 and a "1" is input to reset terminal 7d of oscillator circuit 7. This forces output terminal 7a of oscillator circuit 7 to change from "1" to "0." Thus, at point T4501, semiconductor switch 4302 is turned off, and semiconductor switch 3502 is turned on. The electric charges accumulated in the machining gap are then discharged via resistor 3501, and machining gap voltage Eg immediately falls, as shown in FIG. 38a. In addition, when output terminal 7a of oscillator circuit 7 has changed from "1" to "0" at point T4501, output terminal 7c changes from "0" to "1." Therefore, "1" is input to R-input terminal 3701b of flip-flop 3701, thus resetting flip-flop 3701.

Also, when semiconductor switch 4301 is turned off at point T4501, output terminal 14b of discharge detector circuit 14 shown in FIG. 38c, and output terminal 3702b of no load detector circuit 3702 shown in FIG. 38e, are both set to "0". Thus, the signal in FIG. 38f, illustrating the discharge current waveform, changes to zero.

Flip-flop 3701 is not set during no-load time between points T4401 and T3801. Therefore, if output terminal 3702b of no load detector circuit 3702 is set to "1," output terminal 3703c of two-input AND circuit 3703 remains "0" and oscillator circuit 7 is not reset. Having no third direct-current power supply 9, this embodiment has the same advantages as the second embodiment, with the exception that the machining speed may be lower.

In embodiments 3 to 9, third direct-current power supply 9 and the circuit for applying to the machining gap the output of third direct-current power supply 9 comprising diode 8, semiconductor switch 10, one-shot multivibrator 15 and two-input AND circuit 16 may also be eliminated in a manner similar to that of the eleventh embodiment. In this case, embodiments without third direct-current power supply 9 have the same effect and advantages as those having third direct-current power supply 9, with the exception that the rise of the discharge current may be delayed and thus the machining speed may be lower.

The discharge stop detector circuit 302 which determines that a discharge has stopped when the machining gap voltage Eg exceeds ES0 may be replaced by, for example, discharge stop detector circuit 3700 discussed above and illustrated in FIG. 37. In this case, the voltage E1 need not be lower than the voltage $EY_3$.

It will be apparent that the invention, as described above, achieves an electrical discharge machine which maintains a normal average machining voltage even if discharge is stopped during the application of a voltage to the machining gap so that the machining gap voltage is controlled in a stable manner, the electrode is protected properly, and a high-speed machining operation can be performed with high accuracy.

What is claimed is:

1. An electrical discharge machine, comprising: an electrode;
    a workpiece disposed a predetermined distance from said electrode;
    a series circuit comprising a first power supply and a first switch circuit, said series circuit being connected between said electrode and said workpiece;
    a control circuit for controlling the on/off status of said first switch circuit so as to generate a continuous electrical discharge between said electrode and said workpiece;
    and means for holding a machining gap voltage, between said electrode and said workpiece, at a predetermined value when said first switch circuit is off.

2. An electrical discharge machine as claimed in claim 1, wherein said voltage holding means comprises a bypass circuit for allowing current to flow from said electrode to said workpiece so as to eliminate charge accumulated between said electrode and said workpiece.

3. An electrical discharge machine as claimed in claim 1, wherein said voltage holding means comprises an inverse voltage application circuit, which consists of a second direct-current power supply and a second switch circuit, connected in series between said electrode and said workpiece, said inverse voltage application circuit being connected in inverse parallel with said series circuit.

4. An electrical discharge machine as claimed in claim 3, wherein said voltage holding means includes means for setting the output voltage of said second direct-current power supply so that an average voltage between said electrode and said workpiece is of a predetermined value.

5. An electrical discharge machine as claimed in claim 1, wherein said voltage holding means comprises a select switch circuit for switching one terminal of said first direct-current power supply from said electrode to said workpiece and the other terminal thereof from said workpiece to said electrode, a resistor being connected in series with said select switch circuit.

6. An electrical discharge machine as claimed in claim 3 or 5, further comprising:
    means for setting the application time of a voltage applied by said voltage holding means, to a machining gap between said electrode and workpiece, so that the average voltage across said machining gap is of said predetermined value.

7. An electrical discharge machine as claimed in claim 3 or 5, further comprising:
    means for setting a discharge dwell time, during which the application of a discharge voltage is stopped, so that the average voltage across said machining gap is of said predetermined value.

8. An electrical discharge machine as claimed in claim 3 or 5, further comprising:
    means for setting the discharge voltage application time is provided so as to insure that the average voltage across said machining gap is of said predetermined value.

9. An electrical discharge machine as claimed in claim 1 further comprising:
    a discharge stop detection circuit for detecting that a discharge has stopped during an application of said discharge voltage; and
    a control circuit for turning off said first switch circuit when a discharge stop detection signal is issued from said discharge stop detection circuit.

10. An electrical discharge machine as claimed in claim 1, further comprising:
    a series connection of a third direct-current power supply and a third switch circuit, said series connection being connected in parallel with said series circuit;
    a discharge detection circuit for detecting a discharge across said gap generated by said direct-current power supply;
    and a second control circuit for turning on said third switch circuit for a predetermined period of time when a discharge detection signal is generated by said discharge detection circuit.

* * * * *